United States Patent
Trofimenko

[15] 3,681,381
[45] Aug. 1, 1972

[54] SYMMETRICAL AND UNSYMMETRICAL PYRAZABOLES

[72] Inventor: Swiatoslaw Trofimenko, Wilmington, Del.

[73] Assignee: E. I. du Pont de Nemours and Company, Wilmington, Del.

[22] Filed: Aug. 2, 1968

[21] Appl. No.: 749,623

Related U.S. Application Data

[63] Continuation-in-part of Ser. No. 429,113, Jan. 29, 1965, abandoned.

[52] U.S. Cl. ............260/310, 252/188, 260/308, 260/2 M, 102/31, 149/109
[51] Int. Cl. ...........................................C07d 49/02
[58] Field of Search..........................260/310

[56] References Cited

UNITED STATES PATENTS 3,261,844  12/1970  Trofimenko.................260/299

*Primary Examiner*—Alex Mazel
*Assistant Examiner*—Bernard Dentz
*Attorney*—James W. Ryan

[57] ABSTRACT

Described and claimed are the following:

1. Symmetrical pyrazaboles and sym-triazaboles of the formula

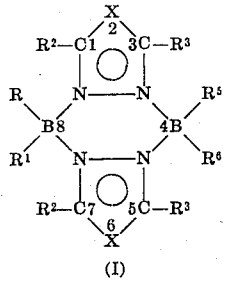

(I)

R, $R^1$, $R^5$ and $R^6$ may be hydrogen, halogen, 1-pyrazolyl, alkyl, aryl, alkoxy, haloalkoxy, aryloxy, alkylamino, arylamino, azido, alkylmercapto and arylmercapto;

X may be N or $CR^4$; and $R^2$, $R^3$ and $R^4$ may be hydrogen, alkyl, halogen, haloalkyl, aryl, cyano, alkoxy, arylamino, alkoxy-carbonyl, nitro, acyl, mercapto and hydroxy with the proviso that $R^2$ and $R^4$ taken together may represent a fused benzo or naphtho structure. In the symmetrical pyrazaboles of this invention either $R = R^1 = R^5 = R^6$ or $R = R^5$ and $R^1 = R^6$.

2. Unsymmetrical pyrazaboles and sym-triazaboles as represented by formula (I), wherein R and $R^1$ may be hydrogen, halogen, 1-pyrazolyl, alkyl, aryl, alkoxy, haloalkoxy, aryloxy, alkylamino, arylamino, azido, alkylmercapto and arylmercapto;

X may be N or $CR^4$;

$R^2$, $R^3$ and $R^4$ may be hydrogen, alkyl, halogen, halo-alkyl, aryl, cyano, alkoxy, arylamino, alkoxycarbonyl, nitro, acyl, mercapto and hydroxy with the proviso that $R^2$ and $R^4$ taken together may represent a fused benzo or naphtho structure; and $R^5$ and $R^6$ are defined the same as R and $R^1$ with the proviso that 1-pyrazolyl is excluded as a substituent in the case of $R^5$ and $R^6$. In the unsymmetrical pyrazaboles and sym-triazaboles of this invention, at least one of R and $R^1$ is chemically distinguishable from $R^5$ and $R^6$.

3. The processes by which the pyrazaboles and sym-triazaboles of this invention may be prepared.

4. Polymers having incorporated therein the pyrazabole and sym-triazabole structure.

The compounds of this invention are useful as polymerization initiators, reducing agents and as reactants in the formation of condensation polymers containing the pyrazabole and sym-triazabole moieties.

19 Claims, No Drawings

SYMMETRICAL AND UNSYMMETRICAL PYRAZABOLES

CROSS-REFERENCE TO RELATED APPLICATION

This application is a continuation-in-part of my co-pending application Ser. No. 429,113, filed Jan. 29, 1965, and now abandoned.

BACKGROUND OF THE INVENTION

1. Field of the Invention

This invention relates to a new class of chemical compounds, the pyrazaboles and sym-triazaboles, which may be represented by the formula

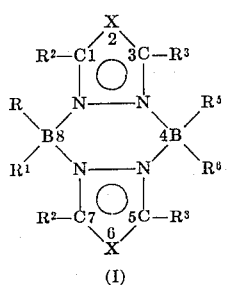

(I)

wherein generally

R, $R^1$, $R^5$ and $R^6$ may be hydrogen, halogen, 1-pyrazolyl, alkyl, aryl, alkoxy, haloalkoxy, aryloxy, alkylamino, arylamino, azido, alkylmercapto and arylmercapto;

X may be N or $CR^4$; and $R^2$, $R^3$ and $R^4$ may be hydrogen, alkyl, halogen, haloalkyl, aryl, cyano, alkoxy, arylamino, alkoxycarbonyl, nitro, acyl, mercapto and hydroxy with the proviso that $R^2$ and $R^4$ taken together may represent a fused benzo or naphtho structure. In the symmetrical compounds of this invention either $R = R^1 = R^5 = R^6$ or $R = R^5$ and $R^1 = R^6$. In the unsymmetrical pyrazaboles and sym-triazaboles of this invention at least one of R and $R^1$ is chemically distinguishable from $R^5$ and $R^6$. There is the further proviso in the case of the unsymmetrical pyrazaboles and sym-triazaboles that neither $R^5$ nor $R^6$ can be 1-pyrazolyl. Preferences for the aforementioned R groups which have been designated as halogen, alkyl, aryl and acyl are as follows: fluorine, chlorine, bromine and iodine, alkyl of up to 18 carbon atoms and especially lower alkyl of one to six carbon atoms, phenyl, phenyl with lower alkyl (of one to six carbon atoms) and/or halo (especially chlorine, bromine or iodine) substituents, and carboxylic type acyl of up to eight carbon atoms.

Additionally, this invention relates to the processes by which the compounds of this invention may be prepared and to various polymers and copolymers that may be produced therefrom.

2. Description of the Prior Art

The following publications are of interest in connection with the present invention:

1. Trofimenko, *J. Am. Chem. Soc.*, 88, 1842 (1966). This communication describes some 4,8-symmetrically substituted pyrazaboles and generally defines the area of boron-pyrazole chemistry.

2. Trofimenko, *J. Am. Chem. Soc.*, 89, 3165 (1967). This paper describes in detail the synthesis of 4,8-symmetrically substituted pyrazaboles and sym-triazaboles.

3. Trofimenko et al., *J. Am. Chem. Soc.*, 89, 3148 and 3158 (1967). These papers describe physical studies on transition metal poly(1-pyrazolylborates).

4. Heitsch, Abstracts, 153rd Am. Chem. Soc. Meeting, L-109 (April 1967). This Abstract entitled "Synthesis of Fluoropyrazaboles by a Unique Route to Boron-Fluorine Compounds" describes inter alia the preparation of 4-fluoropyrazabole and 4,4,8-trifluoropyrazabole by partial fluorination of pyrazabole.

So far as is known, there is not as yet any published literature reference to the unsymmetrical pyrazaboles and sym-triazaboles of this invention.

SUMMARY OF THE INVENTION

The discovery of a new class of organo-inorganic acids formed from a compound containing an element of Group IIIA of the Periodic Chart of the Elements and an organic nitrogen-containing compound of the azole variety, for example, pyrazole, triazole or tetrazole, has been reported in U.S. Pat. No. 3,261,844, issued July 19,1966,to Trofimenko. These highly ionizable compounds are useful as sequestering agents and as corrosion inhibitors; moreover, these compounds chelate readily with the alkaline earth and transition metals. Such compounds may be prepared by the reaction of a compound having the formula $AR_3$ with a pyrazole, triazole or tetrazole. In the aforesaid $AR_3$, A is an element of Group IIIA of the Periodic Chart of the Elements such as may be found in the "Handbook of Chemistry and Physics," 41st Edition, (1959) pgs. 448–9, and R is preferably halogen.

It has been discovered that by maintaining suitable control over the reaction temperature and the molar quantities of the reactants in the reaction of an azole and a compound of the formula $AR_3$ as defined above, and more specifically, when the Group IIIA compound is a boron derivative, an entirely different and novel class of compounds may be synthesized, namely, the pyrazaboles and sym-triazaboles of this invention. Unlike the compounds disclosed in the aforesaid U.S. Pat. No. 3,261,844, these new compounds are not highly ionizable and do not form salts and chelates, but rather, are useful as polymerization initiators, reducing agents and especially as reactants in the formation condensation polymers containing the pyrazabole and sym-triazabole moieties.

The symmetrical pyrazaboles and sym-triazaboles of this invention are represented by the formula

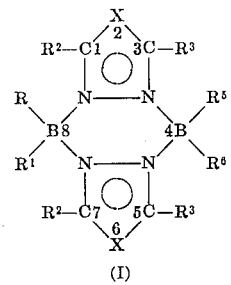

(I)

wherein the various R and X functions have the previously stated significance. The distinctive feature of the symmetrical compounds is that either R, $R^1$, $R^5$ and $R^6$ represent the same substituent or $R = R^5$ and $R^1 = R^6$.

The formation of these symmetrical compounds may be represented by the equation

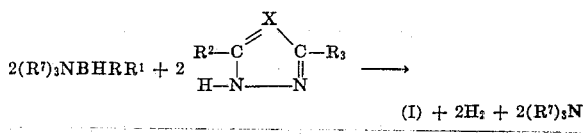

(I) + 2H$_2$ + 2(R$^7$)$_3$N wherein X, R, R$^1$, R$^2$, and R$^3$ are as defined previously and R$^7$ is lower alkyl of one to six carbon atoms. Alternatively, the symmetrical compounds of the present invention may be prepared by the reaction of the pyrazole or triazole with a boron halide, such as boron trichloride, instead of the aminoborane shown in the equation.

As indicated, the products of the instant invention are formed using a pyrazole or triazole as one of the reactants. In general, the azole component can be any azole or substituted azole which has a hydrogen atom affixed to the 1-nitrogen position. Examples of operable azoles are set forth in Table I.

TABLE I

| | |
|---|---|
| 3,4,5-Trimethylpyrazole | 3-Bromo-4-phenylpyrazole |
| 3-Ethylpyrazole | 4-Iodopyrazole |
| 3-Ethynylpyrazole | 3,5-Dimethyl-4-nitropyrazole |
| 3-Butadienylpyrazole | 3-Anilino-5-phenylpyrazole |
| 3-Methyl-5-phenylpyrazole | 3-Methyl-4-hydroxy-5-phenylpyrazole |
| 3,4,5-Triphenylpyrazole | 3-Methoxy-5-methylpyrazole |
| 3-Methyl-5-chloropyrazole | 4-Hydroxymethylpyrazole |
| 4-β-Aminoethylpyrazole | 3-Acetylindazole |
| 4,5-Diformylpyrazole | 3-Cyanoindazole |
| 3-Benzoylpyrazole | 3-Dimethylaminomethylindazole |
| 3,5-Diacetyl-4-phenylpyrazole | Benz[f]indazole (i.e., naphtho-[2,3-d]pyrazole) |
| 3-Methylindazole (i.e., 3-methylbenzopyrazole) | 3-Chloro-5-methyl-1,2,4-triazole |
| 3,5-Dichloroindazole | 3,5-Dimercapto-1,2,4-triazole |
| 5,6-Diaminoindazole | 5,6-Dihydroxyindazole |
| 5,7-Dimethylindazole | 3-Hydroxy-5-phenyl-1,2,4-triazole |

The boron-containing compound which may be reacted with the azole may be one wherein only three substituents are attached to the boron. Alternatively, aminoboron compounds, for example, an aminoborane wherein the trisubstituted boron has been complexed with an amine, also may be employed. The borane component can be any member of a group of compounds broadly designated by the general formula QBRR'R" where Q is some electron pair donor such as an amine (preferably a tertiary amine) or an ether and R, R' and R" may be selected from a group which consists of hydrogen, halogen, alkyl, aryl, alkoxy, aryloxy, alkylamino, arylamino, 1-pyrazolyl, azido, alkylmercapto and arylmercapto. A special case would encompass compounds wherein at least one of the R groups is a hydrogen atom, with the result that dimers containing B-H-B bridging, e.g., diborane

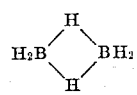

may be formed. In this case, Q may be considered as another BRR'R" unit. Finally, uncomplexed monomeric boranes BRR'R" may be used as well. Alternatively, the borane component may be defined as any source of BRR'R". Such sources would include monomeric boranes, hydrogen-bonded borane dimers and borane complexes with diverse Lewis bases. Examples of operable borane reactants are set forth in Table II.

TABLE II

| | |
|---|---|
| Diborane | o-Phenylenedioxychloroborane |
| Tetrahydrofuran borane | p-Methoxyphenyldichloroborane |
| Pyridine borane | Dibutoxybromoborane |
| Butoxydichloroborane | Boron trifluoride |
| Methoxydichloroborane | Boron trichloride |
| Ethoxydichloroborane | Boron tribromide |
| 2-Chloroethoxydichloroborane | Boron triiodide |
| 3-Chloropropoxydichloroborane | Phenyldibromoborane |
| 4-Chlorobutoxydichloroborane | p-Phenyloxyphenyldibromoborane |
| Allyloxydichloroborane | n-Butyldichloroborane | for example a boron trihalide, other than equimolar amounts of the reactants may be required. In this case the reaction is carried out with an approximately 3 to 1 ratio of azole to boron trihalide in order to insure removal of all halogen. Examples 1 and 2, infra, exemplify this method of formation of the tetraazadiborines of this invention.

A unique feature of the compounds of this invention, one which undoubtedly provides a stabilizing influence on the pyrazabole and sym-triazabole moieties, is that either adjacent nitrogen in the azole portion of the structure (I) may act as the electron donor to the boron. Hence, although the structure (I) may be visualized as suggesting that there are two specific covalent and two specific dative N-B bonds, it is apparent that a modification of (I) which depicts the additional resonance form of each azole ring reverses the covalent and dative bonds. Therefore, there is no distinction between the covalent and dative N-B bonds of the pyrazaboles and sym-triazaboles of this invention.

The unsymmetrical pyrazaboles and sym-triazaboles of this invention with different substituents on the 4- and 8-borons may be synthesized by the following route.

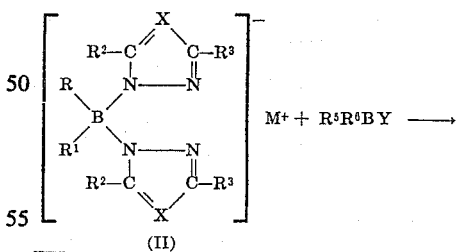

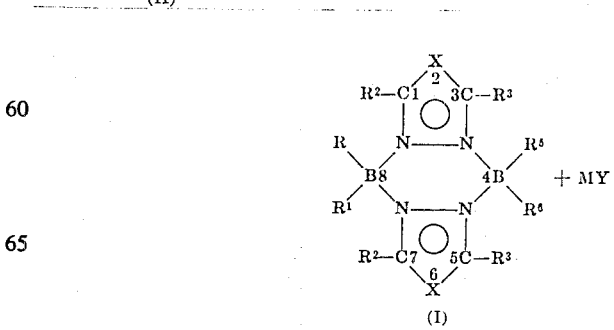

But-3-en-1-yloxydichloroborane
2-Methylallyloxydichloroborane
Dimethoxychloroborane
Diethoxychloroborane
Dibutoxychloroborane
Bis(2-chloroethoxy)chloroborane
Bis(3-chloropropoxy)chloroborane
Bis(4-chlorobutoxy)chloroborane
Diallyloxychloroborane
Bis(but-2-en-1-yloxy)chloroborane
Bis(1-methylallyloxy)chloroborane
Bis(2-methylallyloxy)chloroborane
Bis(3-methylallyloxy)chloroborane
Ethylenedioxychloroborane
Diphenoxychloroborane
Phenoxydichloroborane
α-Naphthyldichloroborane
Phenylbutoxybromoborane
Bis(2-chlorovinyl)chloroborane
Dibutylchloroborane
Dibutylbromoborane
Dimethylbromoborane
Diphenylchloroborane
Diphenylbromoborane
Ethylborane
Methylborane
Diethylborane
Dimethylborane
Butylborane
Phenylborane
Dimethoxyborane
Dimethylaminoborane Symmetrical products of this invention generally are obtained by heating approximately equimolar amounts of the azole and an aminoborane falling within the formula QBRR'R" (defined supra) at elevated temperatures. This may be effected by carrying out the reaction in the melt or in a suitable inert solvent such as a hydrocarbon. Temperatures in the range of 25° to 150° C. are the preferable temperatures. Although temperatures higher than 150° C. may be employed, they usually are avoided. When the reactants employed for the formation of the symmetrical products of this invention are an azole and a compound having the formula BRR'R" (defined supra), In the foregoing representation R, $R^1$, $R^2$, $R^3$, $R^5$ and X are as previously defined with the proviso in the case of the unsymmetrical pyrazaboles and sym-triazaboles that $R^5$ and $R^6$ cannot be 1-pyrazolyl. M is a cation and Y is a leaving group. In the unsymmetrical products of this case at least one of R and $R^1$ is chemically distinguishable from $R^5$ and $R^6$.

With proper selection of the borane reactant, the process depicted above can lead not only to the unsymmetrical pyrazaboles and sym-triazaboles but to the symmetrical products as well. Generally, the process is carried out in the following manner. A polypyrazolylborate anion (II) and a borane component where at least one substituent, Y, is capable of being displaced as an anion are brought together, preferably in the presence of an appropriate solvent or diluent. Good examples of Y are halogen, acyloxy or substituted acyloxy and alkyl- or arylsulfonate groups. Suitable solvents for the above reaction include the diverse ethers (e.g. tetrahydrofuran, 1,2-dimethoxyethane, anisole), aromatic and aliphatic hydrocarbons which would function as diluents and as solvents for the product in the case of a heterogeneous reaction, and the simple halocarbons, ketones or nitriles. The reaction can also be carried out in the absence of a solvent, if the borane component is a liquid, but such a procedure is generally less convenient.

The reaction is usually carried out at atmospheric pressure, there being no need for higher pressures, although such may be employed if desired. Usually reaction proceeds exothermically upon mixing the reactants in a suitable solvent. At times the reaction must be moderated by cooling. In the case of heterogeneous reactions, especially when sizeable quantities of MY are precipitated, it is advantageous to reflux the reaction mixture while stirring it vigorously. The operable temperature range is −40° to 200° C.; the preferred range being 20° to 120° C.

In the selection of a reaction temperature an accomodation must be made between a desirable reaction velocity and the stability of the particular product formed.

In addition to the borate salts illustrated as reactants in the Examples, infra, many other poly(1-pyrazolyl)borates are operable in the process of this invention. Generally, these compounds are set forth in U.S. Pat. No. 3,261,844. A list, intended to be illustrative rather than exhaustive, of operable borates is given in Table III. These reactants may be employed in the form of isolated salts. Alternatively, they may be prepared in situ, proof of their presence resting on their conversion to transition metal chelates.

TABLE III

| | |
|---|---|
| Tetramethylammonium hydrotris-(1-pyrazolyl)borate | Sodium hydrotris (1-pyrazolyl)-borate |
| Lithium hydrotris (1-pyrazolyl)-borate | Cesium hydrotris (1-pyrazolyl)-borate |
| Tetramethylammonium dihydrobis-(1-pyrazolyl)borate | Cesium tetrakis(1-pyrazolyl)-borate |
| Sodium tetrakis(1-pyrazolyl)borate | Lithium tetrakis(1-pyrazolyl)-borate |
| Tetramethylammonium tetrakis(1-pyrazolyl)borate | Potassium hydrotris(1-sym-triazolyl)borate |
| Sodium diethylbis(1-pyrazolyl)-borate | Sodium dibutylbis(1-pyrazolyl)-borate |
| Sodium diphenylbis(1-pyrazolyl)-borate | Potassium dihydrobis(3,4,5-trimethyl-1-pyrazolyl)borate |
| Potassium hydrotris(3,5-dimethyl-1-pyrazolyl)borate | Potassium hydrotris(3,4,5-trimethyl-1-pyrazolyl)borate |
| Potassium hydrotris(4-chloro-1-pyrazolyl)borate | Lithium hydrotris(3,5-dimethyl-1-pyrazolyl)borate |
| Potassium hydrotris(3,5-dimethyl-4-butyl-1-pyrazolyl)borate | Potassium hydrotris(4-isopropyl-1-pyrazolyl)borate |
| Sodium butyltris(1-pyrazolyl)-borate | Pyrazolium phenyltris(1-pyrazolyl)borate |
| Sodium difluorobis(3,5-dimethyl-1-pyrazolyl)borate | |

The following compounds may serve as the borane components: (a) all known and reported haloboranes, (b) acyloxy- and substituted acyloxyboranes, (c) alkyl- and arylsulfonatoboranes, and (d) boronous anhydrides of the structure $R_2B-O-BR_2$ where the departing anion is $R_2BO^{\ominus}$. The categories (b) and (c) need not be isolated but can be prepared in situ by reacting a trialkylborane or triarylborane with a carboxylic and sulfonic or sulfuric acid and these solutions can then be used directly.

A list of known boranes operable in the process of this invention is given in Table IV. These representative boranes were selected from M. F. Lappert's article, "Organic Compounds of Boron," found at Chem. Revs., 56, 959 (1956). The list is intended to be illustrative rather than exhaustive.

TABLE IV

| | |
|---|---|
| Trifluoroborane | Trichloroborane |
| Tribromoborane | Trisacetoxyborane |
| Tris-n-butyroxyborane | Trisisovaleroxyborane, |
| Trisstearyloxyborane | Tristrichloroacetoxyborane |
| Trisbenzoyloxyborane | Tetraacetoxydiborate [(CH$_3$COO)$_2$B]$_2$O |
| Dimethoxyfluoroborane | Dimethylchloroborane |
| Diethoxychloroborane | Di-n-propoxychloroborane |
| Di-n-butoxychloroborane | Di-n-octoxychloroborane |
| Di-isobutoxychloroborane | Di-neopentoxychloroborane |
| Bis(2-chloroethoxy)chloroborane | Diphenoxychloroborane |
| o-Phenylenedioxyboronous anhydride | |
| Diethylboronous anhydride | Dimethylboronous anhydride |
| Diallylboronous anhydride | Di-n-butylboronous anhydride |
| | Diphenylboronous anhydride |

Bis-p-tolylboronous anhydride
n-Butoxydifluoroborane
Ethoxydichloroborane
Butoxydichloroborane
Neopentoxydichloroborane
2-chloroethoxydichloroborane
p-Nitrophenoxydichloroborane
(Butoxy)phenylfluoroborane
(Butoxy)phenylchloroborane
Methylaminodifluoroborane
Diethylaminodichloroborane
Dimethylaminodibromoborane
Dimethylfluoroborane
Dimethylbromoborane
Diethylfluoroborane
Diethylbromoborane
Di-n-propylbromoborane
Di-n-butylchloroborane
Bischlorovinylchloroborane
Diphenylchloroborane
Methyldifluoroborane
Methyldibromoborane
Butyldibromoborane
s-Pentyldifluoroborane
n-Hexyldifluoroborane
Phenyldifluoroborane
Phenyldibromoborane
p-Tolyldichloroborane
p-Methoxyphenyldichloroborane
p-Ethoxyphenyldichloroborane
β-Naphthyldichloroborane
Methoxydifluoroborane
Methoxydichloroborane
Propoxydichloroborane
Isobutoxydichloroborane
n-Octoxydichloroborane
Phenoxydichloroborane
(Butoxy)butylfluoroborane
(Butoxy)butylchloroborane
Bisdimethylaminofluoroborane
Bisdimethylaminochloroborane
Dipropylaminodichloroborane
Diethylaminodibromoborane
Dimethylchloroborane
Dimethyliodoborane
Diethylchloroborane
Di-n-propylchloroborane
Di-n-propyliodoborane
Di-n-butylbromoborane
Diphenylfluoroborane
Diphenylbromoborane
Methyldichloroborane
Ethyldifluoroborane
n-Pentyldifluoroborane
t-Pentyldifluoroborane
Cyclohexyldifluoroborane
p-Tolyldifluoroborane
Phenyldichloroborane
o-Tolyldichloroborane
o-Methoxyphenyldichloroborane
α-Naphthyldichloroborane The following examples describe various embodiments of this invention in greater detail. It is to be understood that these embodiments do not comprise the entire invention, but rather are intended to be illustrative of a broader inventive concept for which the protection of the patent laws is being sought. The invention in its broader context finds supporting disclosure throughout the entire specification, not in the examples alone. Examples 1–29 inclusive pertain to the symmetrical pyrazaboles and sym-triazaboles of this invention. Examples 30–39 inclusive pertain to the unsymmetrical pyrazaboles and sym-triazaboles of this invention.

EXAMPLE 1

4,4,8,8-Tetrakis(1-pyrazolyl)Pyrazabole 6.8 Grams of pyrazole were melted in a test tube and boron trichloride gas was passed into the melt which was also heated externally with a Bunsen flame. When the vigorous boiling stopped, the melt was cooled and yielded a water soluble glass. One portion of the product was treated with a large excess of 50 percent aqueous sodium hydroxide, yielding a solid which was recrystallized from dimethylformamide. The same solid (confirmed by infrared analysis) was obtained by subliming another portion of the glass at >300° C. at 1 mm. pressure. This product was identified as 4,4,8,8-tetrakis(1-pyrazolyl)pyrazabole.
Anal. Calcd. for
$C_{18}H_{18}B_2N_{12}$: C, 50.9; H, 4.25; B, 5.09; Na, none
Found: C, 51.4; H, 4.50; B, 5.55; Na, none

EXAMPLE 2

4,4,8,8-Tetrakis(1-pyrazolyl)Pyrazabole

68 Grams (1 mole) of pyrazole were melted in a flask and boron trichloride was passed into the flask just above the liquid surface. The solution was kept at 100° C. by periodic cooling. When the vigorous reaction ceased, the flask was heated with a Bunsen burner. Vigorous boiling ensued and an acidic vapor was evolved. When gas evolution stopped, the flask contents were distilled at aspirator vacuum. Fractions boiling at about 150° C. and 150°–180° C. were collected. They contained no boron (by flame test).

The pot residue was dissolved in water and treated with a large excess of 50 percent aqueous sodium hydroxide. The solid that precipitated was filtered, washed with water, and recrystallized from dimethylformamide to yield 5.0 g. (7 percent) of 4,4,8,8-tetrakis(1-pyrazolyl)pyrazabole, m.p. 230°–233° C., identical (by infrared analysis) with the product of Example 1.

EXAMPLE 3

Pyrazabole

Two moles of trimethylamine borane and two moles of pyrazole were refluxed with stirring in 400 ml. of toluene for 12 hours. Hydrogen and trimethylamine were evolved. The solution was stripped at reduced pressure yielding 146 g. (91 percent) of pyrazabole. It was purified by sublimation at reduced pressure; m.p. 80°–81 C.
Anal. Calcd. for
$C_6H_{10}B_2N_4$: C, 45.2; H, 6.27; B, 13.5; M.W. 160.
Found: C, 45.4; H, 6.09; B, 13.0; M.W. 166. (by vapor pressure lowering in chloroform at 37° C.).
The infrared spectrum of the product has a characteristic $BH_2$ multiplet in the 2,250–2,420 cm.$^{-1}$ region. The NMR spectrum (A60; $CDCl_3$, TMSi) exhibits a doublet at 451 cps. and a triplet at 370 cps. with area ratios of 2:2:1(J=2). The BH is exceedingly broad and can be seen only by integration; an area corresponding to four protons is centered around 200 cps.

EXAMPLE 4

4,4,8,8-Tetrakis(1-pyrazolyl)Pyrazabole

The product of Example 3 (34 g., 0.212 mole) was mixed with slightly over 0.424 mole of pyrazole and heated with stirring until no more hydrogen was evolved. The melt was allowed to solidify and was then recrystallized from 500 ml. of refluxing toluene. The solid was washed with ether and air-dried; m.p. 259°–260° C.; yield 34 g. of 4,4,8,8-tetrakis(1-pyrazolyl)pyrazabole.
Anal. Calcd. for
$C_{18}H_{18}B_2N_{12}$: C, 50.9; H, 4.25; M.W. 424
Found: C, 51.8; H, 4.29; M.W. 399 (by vapor pressure lowering in chloroform at 37° C.).
NMR (A60; $CDCl_3$, TMSi): 454 cps. (doublet; area = 4), 402 cps. (doublet; area = 2), 495 cps. (triplet; area = 1), and 363 cps. (triplet area = 2).

EXAMPLE 5

1,3,5,7-Tetramethylpyrazabole

Half a mole of 3,5-dimethylpyrazole and half a mole of trimethylamine borane were stirred and refluxed in 400 ml. of xylene, allowing the solvent to distill very slowly. After 3 hours a sample of the solution was evaporated and the solid residue sublimed. The infrared spectrum of the sublimate had the characteristic $BH_2$ bands. The rest of the solution was then stripped to dryness and the crude solid was recrystallized from toluene. Yield of recrystallized 1,3,5,7-tetramethylpyrazabole was 31 g. (57 percent); m.p. 185° C.
Anal. Calcd. for
$C_{10}H_{18}B_2N_4$: C, 55.6; H, 8.33; M.W. 216.
Found: C, 56.6; H, 8.65; M.W. 210. (vapor pressure lowering in chloroform).

EXAMPLE 6

2,6-Dibromopyrazabole 14.8 Grams of 4-bromopyrazole (0.1 mole) and 7.3 g. of trimethylamine borane (0.1 mole) were refluxed overnight in 250 ml. of toluene. The solution was stripped, leaving a solid residue which was purified by sublimation. The purified analytical sample of 2,6-dibromopyrazabole was recrystallized from xylene and resublimed; m.p. 144°–145° C.

Anal. Calcd. for $C_6H_8B_2Br_2N_4$: Br, 50.3; N, 17.6
Found: Br, 51.5; N, 17.7.

EXAMPLE 7

1,3,5,7-Tetraphenylpyrazabole 15.8 Grams (0.072 mole) of 3,5-diphenylpyrazole were refluxed overnight with 10 percent excess trimethylamine borane in 350 ml. of a 1:2 xylene-benzene mixture. Trimethylamine was evolved. After stripping the reaction mixture the residue was triturated with hexane and filtered. The solid was recrystallized from xylene. There were obtained 9.8 g. of 1,3,5,7-tetraphenylpyrazabole, melting at 203° C. with decomposition. An analytical sample was obtained by subliming at 250° C. and 1 mm. pressure.

Anal. Calcd. for $C_{30}H_{26}B_2N_4$: C, 77.6; H, 5.70; N, 12.1
Found: C, 79.3; H, 5.69; N, 12.3.

EXAMPLE 8

4,4,8,8-Tetrachloropyrazabole 16.0 Grams (0.1 mole) of the product of Example 3 were dissolved in 800 ml. of carbon tetrachloride and chlorine was bubbled in until the yellow color persisted. Hydrogen chloride was evolved and a white solid precipitated. The mixture was stirred for an hour and filtered. There were obtained 29 g. (98 percent) of 4,4,8,8-tetrachloropyrazabole, melting at 215°–220° C. The product was purified by recrystallization from chlorobenzene and by sublimation; m.p. 222°–223° C.

Anal. Calcd. for $C_6H_6B_2Cl_4N_4$: C, 24.2; H, 2.01; Cl, 47.7
Found: C, 24.9; H, 2.13; Cl, 47.8.

EXAMPLE 9

4,4,8,8-Tetrabromopyrazabole

16 Grams (0.1 mole) of the product of Example 3 were stirred in 400 ml. of carbon tetrachloride at room temperature. A solution of 64 g. (0.4 mole) of bromine in 100 ml. of carbon tetrachloride was added dropwise. Hydrogen bromide was evolved exothermically. The hot solution was left stirring overnight and was filtered the next day to remove the precipitate. The product 4,4,8,8-tetrabromopyrazabole was recrystallized from chlorobenzene; yield 25.0 g. (52 percent); m.p. 291°–293° C. The material is sublimable in vacuo.

Anal. Calcd. for $C_6H_6B_2Br_4N_4$: C, 15.2; H, 1.26; Br, 67.25
Found: C, 16.2; H, 1.74; Br, 66.24.

EXAMPLE 10 sym-Triazabole

Triethylamine borane and 1,2,4-triazole (0.3 mole of each) were mixed and heated at 110°–115° C. Triethylamine was evolved smoothly at first, but then strong foaming commenced and some of the product was lost. The foamy residue was mixed with diethylene glycol dimethyl ether and refluxed for 2 hrs. The solvent was distilled at reduced pressure and the residue was sublimed. There were obtained 22 g. (90 percent) of sym-triazabole which exhibited $BH_2$ absorption in the infrared spectrum. It was purified by sublimation. The pure material softens at about 120° C.; continued heating leads to evolution of gas and polymerization.

Anal. Calcd. for $C_4H_8B_2N_6$: C, 29.7; H, 4.94; N, 51.8
Found: C, 31.2; H, 5.39; N, 51.8.

EXAMPLE 11

4,8-Diphenyl-4,8-bis(1-pyrazolyl)Pyrazabole

Phenylboron dichloride (28.6 g., 0.179 mole) was added to a suspension of 0.54 mole of pyrazolyl potassium in benzene and the mixture was refluxed overnight. The solid was filtered. It was stirred with water, filtered, and the insoluble part washed with water again. After drying 2.0 g. of 4,8-diphenyl-4,8-bis(1-pyrazolyl)pyrazabole were recovered. The original benzene solution was stripped to dryness and the residue triturated with ether. An additional 9.0 g. of product were obtained for a total yield of 11.0 g. (28 percent). The compound was purified by recrystallization from dimethylformamide and then by sublimation. It melts at 237°–240° C.

Anal. Calcd. for $C_{24}H_{22}B_2N_8$: C, 64.9; H, 4.96; N, 25.2
Found: C, 64.8; H, 4.89; N, 24.9.

EXAMPLE 12

4,4,8,8-Tetraethylpyrazabole

Sixteen Grams (0.1 mole) of the product of Example 3 were maintained for 3 hrs. at 250° C. in a bomb under 500 atm. ethylene pressure. A waxy solid weighing 51.5 g. was obtained. It was distilled in vacuo to yield 7.4 g. of a fraction, b.p. 68°–110° C. at 1 mm. pressure and 10.5 g. of another fraction boiling at 110°–148° C. at 1 mm. pressure. Both fractions solidified at room temperature. The first was a mixture of partially alkylated starting material, as judged by the complex B-H stretching frequency in its infrared spectrum. The second was purified by recrystallization from 90 percent aqueous ethanol and identified as 4,4,8,8-tetraethylpyrazabole.

Anal. Calcd. for $C_{14}H_{26}B_2N_4$: C, 61.8; H, 9.56; B, 7.94
Found: C, 61.7; H, 9.35; B, 7.90.

The pot residue could not be distilled in vacuo. It contained 0.60 percent boron, which corresponds to 125 ethylene units per pyrazabole unit, indicating the copolymerizability of the pyrazaboles and sym-triazaboles with olefinic hydrocarbons.

EXAMPLE 13

Pyrazabole As A Reducing Agent

Fifty mmoles of the product of Example 3 and 0.1 mole of benzil were refluxed for 24 hours in 300 ml. of toluene. The solution was stripped at reduced pressure and the residue triturated with ether. A white solid which separated was filtered and washed with ether; yield 7.0 g.; m.p. 234°–245° C. The filtrate was chromatographed on alumina yielding 2.4 g. (11 percent) of unreacted benzil and 2.2 g. (11 percent) of meso 1,2-diphenylethylene glycol, m.p. 134°–136° C. (identified by comparing its infrared and NMR. spectra with those of an authentic sample, m.p. 136° C.).

The high melting solid was the reaction product of the pyrazabole and 1,2-diphenylethylene glycol. This example demonstrates the usefulness of the products of this invention as reducing agents.

EXAMPLE 14

Polymer from Pyrazabole and Bis(p-aminophenyl)methane

In order to demonstrate the usefulness of the compounds of this invention in the formation of polymers, 10 millimoles of the product of Example 3 and 20 millimoles of bis(p-aminophenyl)methane were mixed and melted. The mixture was heated with a hot-air gun. Hydrogen was evolved briskly and the melt became viscous and finally solidified to a tough polymer substantially comprised of a plurality of units having the structure:

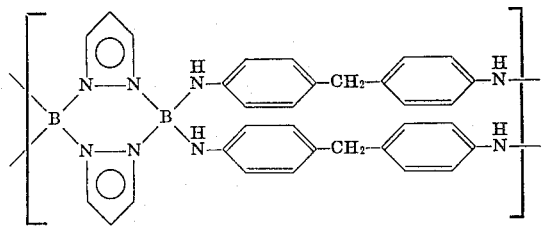

EXAMPLE 15

Polymer from Pyrazabole and Hydroquinone

Ten millimoles of pyrazabole and 20 mmoles of hydroquinone were mixed and melted. Upon heating to about 200° C. hydrogen was evolved and the melt solidified to a tough polymer substantially comprised of a plurality of units having the structure:

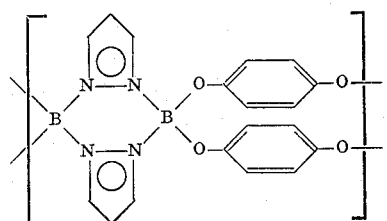

EXAMPLE 16

Polymer from 4,4,8,8-Tetrachloropyrazabole and Hydroquinone

Ten mmoles of the product of Example 8, and 20 mmoles of hydroquinone were mixed together and heated with an air gun. Hydrogen chloride was evolved and a polymer similar to that from Example 15 was obtained.

EXAMPLE 17

Polymer from 4,4,8,8-Tetrakis(1-pyrazolyl)pyrazabole and Hydroquinone

Ten mmoles of the product of Example 1 and 20 mmoles of hydroquinone were mixed, melted and heated with an air gun. Pyrazole was evolved and the melt solidified to a polymer similar to that from Examples 15 and 16.

EXAMPLE 18

Polymer from Pyrazabole and Pentaerythritol

Five mmoles of the product of Example 3 and 5 mmoles of pentaerythritol were mixed, melted and heated with an air gun. The melt evolved hydrogen and then solidified to a tough polymer substantially comprised of a plurality of units having the structure:

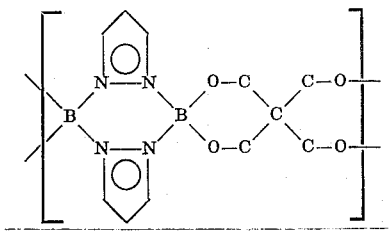

The polymer softened, without melting, at 390° C. It could be pressed to a tough film of the type useful for packaging.

EXAMPLE 19

4,4,8,8-Tetraethylpyrazabole

Triethylborane (31 ml., 0.22 mole) was added slowly to a solution of 19 g. (0.28 mole) of pyrazole in 250 ml. of benzene, the whole system being under nitrogen. The solution was refluxed for 2 days, then 150 ml. of xylene were added, benzene was distilled out, and the solution was refluxed at the boiling point of xylene for 3 hours. It was then stripped to dryness and the residue was recrystallized from aqueous ethanol. There were obtained 27.4 g. (94 percent) of 4,4,8,8-tetraethylpyrazabole identical in all respects with the product of Example 12.

EXAMPLE 20

4,4,8,8-Tetraphenylpyrazabole

A mixture of 22.6 g. (0.094 mole) of triphenylboron and 70 g. (1 mole) of pyrazole was refluxed until benzene ceased to distill out (15 minutes); 8 ml. of benzene were collected. The still-hot melt was poured into 800 ml. of water and left standing for several days. After filtration the crude product was washed with water several times and was air-dried. It was purified by recrystallization from 200 ml. of boiling toluene. There were obtained 15.7 g. (72.4 percent) of crystalline 4,4,8,8-tetraphenylpyrazabole in two crops. It is sublimable and melts at 273°–274° C.

Anal. Calcd. for
$C_{30}H_{26}B_2N_4$: C, 77.6; H, 5.60; N, 12.0
Found: C, 77.9; H, 5.40; N, 11.6.

EXAMPLE 21

4,4,8,8-Tetrachloro-2,6-dibutyl-1,3,5,7-tetramethylpyrazabole

Part A

3-Butylacetylacetone (33.2 g., 0.212 mole) was dissolved in 50 ml. of methanol and added slowly to 11.0 g. (0.233 mole) of hydrazine hydrate in 100 ml. of methanol at 10° C. The solution was stripped and the residue was distilled to yield 25 g. (78 percent) of 4-butyl-3,5-dimethylpyrazole boiling at 119°–120° C./1mm. It solidified on standing; m.p. 44°–45° C.
Anal. Calcd. for
$C_9H_{16}N_2$: C, 71.0; H, 10.6; N, 18.4
Found: C, 71.1; H, 10.6; N, 18.5.

Part B

A mixture of 0.1 mole of 4-butyl-3,5-dimethylpyrazole and 0.11 mole of trimethylamine borane was refluxed overnight in 200 ml. of benzene. The solution was stripped to yield 2,6-dibutyl-1,3,5,7-tetramethylpyrazabole in the form of an oil.

Part C

The whole product from Part B was dissolved in 200 ml. of carbon tetrachloride and exhaustively chlorinated by bubbling in chlorine until the yellow color persisted to yield 22 g. (94 percent) of crude 4,4,8,8-tetrachloro-2,6-dibutyl-1,3,5,7-tetramethylpyrazabole. It was purified by recrystallization from toluene and then by sublimation; m.p. 244°–245° C.
Anal. Calcd. for
$C_{18}H_{30}B_2Cl_4N_4$: C, 46.4; H, 6.45; Cl, 30.5
Found: C, 46.9; H, 6.65; Cl, 30.2.

EXAMPLE 22

1,3,5,7-Tetrakis(trifluoromethyl)pyrazabole

Part A 1,1,1,5,5,5-Hexafluoropentane-2,4-dione (208 g., 1.00 mole) was added at 5° C. to a solution of 60 g. (1.2 moles) of hydrazine hydrate in 1.5 liters of ethanol. The solution was evaporated at aspirator vacuum and 40° C. to yield a white solid which was recrystallized from toluene. Two crops, 148 and 15 g., were obtained for a total yield of 72 percent of 3,5-bis(trifluoromethyl)-3,5-dihydroxypyrazolidine. The material was purified by sublimation; m.p. 133°–135° C.
Anal. Calcd. for
$C_6H_6F_6N_2O_2$: C, 25.0; H, 2.50; F, 47.5
Found: C, 25.9; H, 2.73; F, 47.5

Part B 3,5-Bis(trifluoromethyl)-3,5-dihydroxypyrazolidine (173 g., 0.72 mole) was melted and heated with stirring. Water was distilled out slowly, then the temperature rose and material boiling at 147°–149° C./atm. came over and solidified. There were obtained 118 g. (81 percent) of 3,5-bis-(trifluoromethyl)pyrazole; m.p. 84° C. It had an unpleasantly pungent odor and sublimed with great ease.
Anal. Calcd. for
$C_5H_2F_6N_2$: C, 29.4; H, 0.98; F, 56.0; M.W. 204
Found: C, 29.5; H, 1.20; F, 56.2; M.W. (cryoscopic in benzene), 208

Part C 3,5-Bis(trifluoromethyl)pyrazole (20.4 g., 0.1 mole) was stirred in 70 ml. of tetrahydrofuran and 100 ml. of a 1 molar solution of borane in tetrahydrofuran were added slowly. Hydrogen was evolved. The solvent was removed at aspirator vacuum and the residue was sublimed in vacuo to yield 20.1 g. (93.3 percent) of colorless crystals of 1,3,5,7-tetrakis(trifluoromethyl)pyrazabole. The material was purified further by recrystallization from n-heptane and then by sublimation; m.p. 88°–89° C. Presence of

is attested by infrared bands at 2,600 and 2,500 cm.$^{-1}$.

EXAMPLE 23

4,4,8,8-Tetrachloro-2,6-diisopropylpyrazabole

Part A

A mixture of 4-isopropylpyrazole (5.1 g., 0.046 mole) and trimethylamine borane (3.38 g., 0.046 mole) was refluxed overnight in 40 ml. of toluene. After stripping the solvent, 2,6-diisopropylpyrazabole was obtained as an oil.

Part B

All of the product from Part A was dissolved in 200 ml. of carbon tetrachloride and exhaustively chlorinated by bubbling in chlorine until the yellow color persisted. The crude product was purified by sublimation at 200° C./1 mm. There were obtained 5.3 g. (60 percent overall yield) of 4,4,8,8-tetrachloro-2,6-diisopropylpyrazabole in the form of a colorless solid which was purified further by recrystallization from heptane; m.p., 207°–208° C.
Anal. Calcd. for
$C_{12}H_{18}B_2Cl_4N_4$: C, 37.7; H, 4.72; Cl, 37.1
Found: C, 38.7; H, 5.10; Cl, 36.8.

EXAMPLE 24

4,8-Dichloro-2,6-bis(perfluoroisopropyl)pyrazabole

Part A

Pyrazole (68 g.) and hexafluoroacetone (180 g.) were heated in an autoclave for two hours at 200° C. The unreacted hexafluoroacetone was vented and 125 g. of sulfur tetrafluoride and 30 g. of hydrogen fluoride were added. The mixture was heated at 125° C. for 2 hours. It was then cooled and poured into 4 liters of water. After two hours the solid was filtered and taken up in 300 ml. of hot benzene; the solution was filtered and evaporated in a stream of $N_2$. The product was sublimed at 100° C/8 mm. to obtain 4-perfluoroisopropylpyrazole in 70 percent yield.
Anal. Calcd. for
$C_6H_3F_7N_2$: C, 30.5; H, 1.27; F, 56.4; N, 11.9
Found: C, 30.6; H, 1.38; F, 56.7; N, 11.1

Part B

4-Perfluoroisopropylpyrazole (47.2 g., 0.2 mole) and 15 g. (0.22 mole) of trimethylamine borane were refluxed overnight in 250 ml. of xylene. The solvent was removed at reduced pressure and the residue was distilled to yield a total of 32.4 g. (65.5 percent) of liquid 2,6-bis-(perfluoroiso-propyl)pyrazabole, the main fraction of which boiled at 70°–78° C./2 mm. and solidified on cooling; m.p., 49°–50° C. The NMR spectrum has a singlet at 1.91τ.
Anal. Calcd. for
$C_{12}H_8B_2F_{14}N_4$: C, 29.0; H, 1.61; F, 53.7
Found: C, 29.6; H, 1.88; F, 55.2

Part C

A 3.2 g. sample of crude 2,6-bis-(perfluoroisopropyl)-pyrazabole was dissolved in a 1:1 mixture of chloroform and carbon tetrachloride and chlorine was bubbled in until the yellow color persisted. The solvents were stripped and the residue was purified by recrystallization from toluene and then by sublimation. There were obtained 2.6 g. (72 percent) of solid 4,8-dichloro-2,6-bis(perfluoroisopropyl)pyrazabole; m.p. 143°–144° C. The IR spectrum indicates a B-H singlet at about 2,510 cm$^{-1}$.

Anal. Calcd. for
$C_{12}H_6B_2Cl_2F_{14}N_4$: C, 25.5; H, 1.06; Cl, 12.6; F, 47.2
Found: C, 25.7; H, 133; Cl, 13.6; F, 47.2.

Further exemplification of this invention may be found in the following table (Table V) which depicts the products obtained when a variety of boranes and azoles are interacted using previously described procedures.

TABLE V

| | Boron-containing reactant | Azole reactant | Procedure of Examples | Pyrazabole and triazabole products |
|---|---|---|---|---|
| 1 | Diborane | 3,4,5-trimethylpyrazole | 3 | 1,2,3,5,2,7-hexamethylpyrazabole. |
| 2 | Tetrahydrofuran borane | 3-ethypyrazole | 3 | 1,5(7)-diethylpyrazabole. |
| 3 | Pyridine borane | 3-ethynylpyrazole | 3 | 1,5(7)-diethynylpyrazabole. |
| 4 | Butoxydichloroborane | 3-butadienylpyrazole | 3 | 1,5(7)-dibutadienyl-4,6-dibutoxy-4,6-dichloropyrazabole. |
| 5 | Methoxydichloroborane | 3-methyl-5-phenylpyrazole | 3 | 4,6-dichloro-4,6-dimethoxy-1,5(7)-dimethyl-3,7(5)-diphenyl-pyrazabole. |
| 6 | Ethoxydichloroborane | 3,4,5-triphenylpyrazole | 3 | 4,6-dichloro-4,6-diethlxy-1,2,35,2,7-hexaphenylpyrazabole. |
| 7 | 2-chloroethoxydichloroborane | 3-methyl-5-chloropyrazole | 3 | 3,4,7(5),6-tetrachloro-4,6-bis(2-chloroethoxy)-1,5(7)-dimethylpyrazabole. |
| 8 | 3-chloropropoxydichloroborane | 4-β-aminoethylpyrazole | 3 | 4,6-dichloro-4,6-bis(3-chloropropoxy)-2,2-bis(2-aminoethyl)pyrazabole. |
| 9 | 4-chlorobutoxydichlotoborane | 4,5-diformylpyarzole | 3 | 4,6-dichloro-4,6-sis(4-chlorobutoxy)-2,3,27(5)-tetraformylpyrazabole |
| 10 | Allyloxydichloroborane | 3-benzoylpyrazole | 3 | 4,6-bis(allyloxy)-4,6-dichloro-1,5(7)-dibenzoylpyrazabole. |
| 11 | But-3-en-1-yloxydichloroborane | 3,5-diacetyl-4-phenylpyrazole | 3 | 1,3,5,7-tetracetyl-4,6-bis(but-3-en-l-yloxy)-4,6-dichloro-2,2-diphenylpyrazabole. |
| 12 | 2-methylallyloxydichloroborane | 3-methylindazole (i.e., 3-methylbenzopyrazole) | 3 | 4,6-dichloro-4,6-bis(2-methallyloxy)-3,7-dimethyldibeneo(a,g)pyrazabole. |
| 13 | Dimethoxychloroborane | 5,7-dimethylindazole | 3 | 4,4,6,6-tetramethoxybia(2,4-diemthylbenzo)(a,g)pyrazabole. |
| 14 | Diethoxychloroborane | 3,5-dichloroindazole | 3 | 3,7-dichloro-4,6-tetraethoxybia(2-chlorobenzo)(a,g)pyrazabole. |
| 15 | Dibutoxychloroborane | 5,2-diaminoindazole | 3 | 4,4,6,6-tetrabutoxybis(2,3-diaminobenzo)(a,g)pyrazabole. |
| 16 | Bis-(2-chloroethoxy)chloroborane | 5,2-dihydroxyindazole | 3 | 4,4,6,6-tetrakis(2-chloroethoxy)bis(2,3-dihydroxybenzo)(a,g)pyrazabole. |
| 17 | Bis(3-chloropropoxy)chloroborane | 3-bromo-4-phenylpyrazole | 3 | 1,5(7)-dibromo-4,4,6,6-tetrakis(3-chloropropoxy)-2,2-diphenylpyrazabole. |
| 18 | Bis(4-chlorobutoxy)chloroborane | 3,5-dimercapto-1,2,4-triazole | 3 | 4,4,6,6-tetrakis(4-chlorobutoxy)-1,3,5,7-tetramercapto-zym-triazabole. |
| 19 | Diallylosychloroborane | 3,5-dimethyl-4-nitropyrazole | 3 | 4,4,6,6-tetrakis(allyloxy)-1,3,5,7-tetramethyl-2,2-dinitropyrazabole. |
| 20 | Bis(but-2-en-1-yl-oxy)chloroborane | 3-anilino-5-phenylpyrazole | 3 | 1,5(7)-dianiliuo-4,4,6,6-tetrakis(but-2-en-l-yloxy)-3,7(5)-diphenylpyrazabole. |
| 21 | Bis(1-methylallyloxy)chloroborane | 3-methyl-4-hydroxy-5-phenylpyrazole | 3 | 2,2-dihydroxy-4,4,6,6-tetrakis(l-methyalloxy)-1,5(7)-dimethyl-3,7(5)-dimethyl-3,7(5)-diphenylpyrazabole. |
| 22 | Bis(2-methylallyloxy)chloroborane | 3-methoxy-5-methylpyrazole | 3 | 4,4,6,6-tetrakis(2-methallyloxy)-1,5,(7)-dimethoxy-3,7(5)-dimethylpyrazabole. |
| 23 | Bis(3-methylallyloxy)chloroborane | 4-hydroxymethylpyrazole | 3 | 2,2-bis(hydroxymethyl)-4,4,6,6-tetrakis(3-methallyloxy)pyrazabole. |
| 24 | Ethylenedioxychloroborane | 3-acetylindazole | 3 | 3,7-diacetyl-4,4,6,6-bis(ethylendioxy)dibenzo(a,g)pyrazabole. |
| 25 | Diphenoxychloroborane | 3-cyanoindazole | 3 | 3,7-dicyano-4,4,6,6-tetraphenoxydibenzo(a,g)pyrazobole. |
| 26 | Phenoxydichloroborane | 3-dimethyleminomethylindazole | 3 | 4,6-dichloro-3,7-bis(dimethyleminomethyl)-4,6-diphenoxydibenzo(a,g)pyrazabole. |
| 27 | o-Phenylendioxychloroborane | Benz(f)indazole (i.e., naphtho(2,3-d)pyrazole). | 3 | 4,4,6,6-bis(o-phenylendioxy)dinaptho(2,3,-a:2,3-glpyrazabole. |
| 28 | p-Methoxyphenyldichloroborane | 3-chloro-5-methyl-1,2,4-triazole. | 3 | 1,4,5(7),6-tetrachloro-4,6-bis(p-methoxyphenyl)-3,7(5)-dimethyl-sym-triazabole. |
| 29 | Dibutoxybromoborane | 3-hydroxy-5-phenyl-1,2,4-triazole. | 3 | 4,4,6,6-tetrabutoxy-1,5(7)-dihydroxy-3,7(5)-diphenyl-sym-triazabole. |
| 30 | Boron trifluoride | 4-iodopyrazole | 2 | 2,2-diiodo-4,6,6-tetrakis(4-iodop, razol-1-yl)pyrazabole. |
| 31 | Boron trichloride | 3-methoxy-5-methylpyrazole | 2 | 1,5(7)dimethoxy-4,4,6,6-tetrakis(3(5)-methoxy-5(3)-methylpyrazol-l-yl)-3,7(5)dimethylpyrazabole. |
| 32 | Boron tribromide | 3-allylamino-5-phenylpyrazole | 2 | 1,5(7)-bis(3-allylamino)-4,4,6,6-tetrakis(3-allylamino-5-phenylpyrazol-l-yl)-3,7(5)-diphenylpyrazabole. |
| 33 | Boron triiodide | Ethyl 4-pyrazolecarboxylate | 2 | 2,2-bis(ethoxycarbonyl)-4,4,6,6-tetrakis(4-ethoxycarbonylpyrazol-l-yl)pyrazabole. |
| 34 | Phenyldibromoborane | Methyl 4-phenylpyrazole-3-carboxylate. | 11 | 1,5(7)-bis(methoxycarbonyl)-4,6,bis(3-ethoxycarbonyl-4-phenyl-pyrazol-1-yl)-2,4,2,6-tetraphenlpyrazabole. |
| 35 | P-phenyloxphenyldibromoborane. | Pyrazole | 11 | 4,6-bis(p-phenoxyphenyl)-4,6-dipyrazol-l-ylpyrazabole. |
| 36 | n-Butyldichloroborane | do | 11 | 4,6-bis(n-butyl)-4-6-dipyrazol-l-ylprazabole. |
| 37 | α-Naphthyldichloroborane | do | 11 | 4,6-bis(α-napthyl)-4,6-dipyrazol-l-ylpyrazabole. |
| 38 | Phenylbutoxybromoborane | do | 3 | 4,6-dibutoxy-4,6-diphenylpyrazabole. |
| 39 | Bis(2-chlorovinyl)chloroborane. | do | 3 | 4,4,6,6-tetrakis(2-chlorovinyl)pyrazabole. |
| 40 | Dibutylchloroborane | do | 3 | 4,4,6,6-tetrabutylpyrazabole. |
| 41 | Azidodiphenylborane* | do | 3 | 4,4,6,6-tetraphenylpyrazabole. |
| 42 | Dimethylbromoborane | do | 3 | 4,4,6,6-tetramethylpyrazabole. |
| 43 | Diphenylchloroborane | do | 3 | 4,4,6,6-tetraphenylpyrazabole. |
| 44 | Anilinodimethylborane | do | 19 | 4,6-dianilino-4,6-dimethylpyrazabole. |
| 45 | Ethylborane | do | 22-C | 4,6-diethylpyrazabole. |
| 46 | Methylborane | do | 22-C | 4,6-dimethylpyrazabole. |
| 47 | Diethylborane | do | 22-C | 4,4,6,6-tetraethylpyrazabole. |
| 48 | Dimethylborane | do | 22-C | 4,4,6,6-tetramethylpyrazabole. |
| 49 | Butylborane | do | 22-C | 4,6-dibutylpyrazabole. |
| 50 | Phenylborane | do | 22-C | 4,6-diphenylpyrazabole. |
| 51 | Dimethoxyborane | do | 22-C | 4,4,6,6-tetramethoxypyrazabole. |
| 52 | Dimethylaminoborane | do | 22-C | 4,6-bis(dimethylamino)pyrazabole. |
| 53 | Tris(methylthio)borane | do | 19 | 4,4,6,6-tetrakis(methylthio)pyrazabole. |
| 54 | Methlthiodichloroborane | do | 3 | 4,6-bis(methylthio)-4,6-dipyrazol-l-ylpyrazabole. |
| 55 | Tris(n-pentylthio)borane | do | 19 | 4,4,6,6-tetrakis(n-pentylthio)pyrazabole. |
| 56 | Ethylthiodibromoborane | do | 3 | 4,6-bis(ethylthio)-4,6-dipyrazol-l-ylpyrazabole. |
| 57 | Diazidodimethylaminoborane* | do | 3 | 4,6-diazido-4,6-bis(dimethylamino)pyrazabole. |
| 58 | Azidobis(dimethylamino)borane.* | do | 3 | 4,4,6,6-tetrakis(dimethylamino)pyrzabole. |
| 59 | Diazidodiethylaminoborane* | do | 3 | 4,6-diazido-4,6-bis(diethylamino)pyrazabole. |

* Azido compounds are explosive and must be handled with appropriate care.

The above examples have demonstrated the utility of the compounds of this invention in a variety of ways. Thus, when compounds having the formula I are heated with polyfunctional active hydrogen compounds, i.e. compounds having a plurality of active or Zerewitinoff hydrogen atoms, RH and R¹H are evolved and polymers are formed. These active hydrogen-containing compounds further may be represented by the general formula

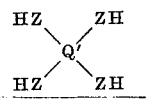

wherein Z may be a heteroatom, such as O, S, N or P, preferably O or N, appropriately substituted or saturated where necessary to satisfy its valence bonds, and Q' is a polyradical, being either a pair of diradical linking units or a tetraradical linking unit. These are illustrated by Examples 14–18 and constitute the most general utility of compounds of formula I. These polymers are comprised substantially of a plurality of units having the structure

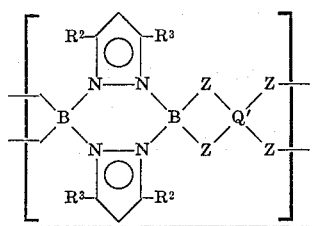

with $R^2$, $R^3$, Q' and Z as defined above. The compounds of the instant invention, also, are useful for initiating the polymerization of olefins and, moreover, are able to be copolymerized therewith, as shown by Example 12. Finally, as exemplified by Example 13 wherein a carbonyl group is reduced to a hydroxymethylene group, the pyrazaboles and sym-triazaboles of this invention may be used as reducing agents.

During the course of the experimentation relating to the present invention, it was discovered that still another type of polymeric pyrazabole may be prepared. Instead of performing the pyrazabole and subsequently converting to polymer by reaction thereof with an active hydrogen-containing material, the polymeric pyrazabole may be formed directly from a dipyrazole, and preferably one free of active hydrogen except for ring NH, and a boron-containing compound of the type previously described for the formation of the tetraazadiborines. The requisite dipyrazole may be represented by the formula

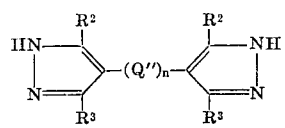

wherein $n$ is zero or one, Q'' may be an $\alpha,\omega$-hydrocarbylene of up to 18 carbon atoms, preferably alkylene of one to 10 carbon atoms, p-phenylene, p, p'-diphenylene, p-xylylene, and the like, and $R^2$ and $R^3$ are as defined hereinabove. The polymers formed by means of the aforesaid reactants are produced by the same process previously described for the preparation of the pyrazaboles. Such polymers are comprised of a plurality of, preferably greater than ten, repeat units having the structure

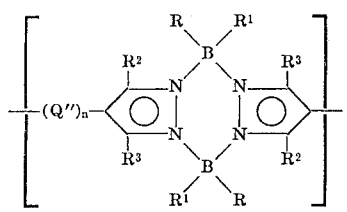

wherein the R groups, Q'' and $n$ are as defined above. They are tough, high melting materials and may be converted into various shaped structures by extrusion, injection or compression molding, casting techniques, and the like. In the process of forming the polymeric pyrazaboles directly, use of an active hydrogen-free dipyrazole is preferred since the use of such materials precludes the formation of three-dimensional polymeric networks via the competing (cross-linking) reaction which has been previously described as occurring between a preformed pyrazabole and an active hydrogen-containing material. As exemplification of the process of direct formation of polymeric pyrazaboles are presented the following examples.

EXAMPLE 25

Polymer from 3,5,3',5'-Tetramethyl-4,4'-xylylenedipyrazole and Triethylborane

Part A

A solution of 85 g. of 1,4-bis(2,2-diacetylethyl)benzene in 800 ml. of ethanol at 60° C. was added to a solution of 32 g. of hydrazine hydrate in 400 ml. of methanol. An exothermic reaction took place and a solid separated. The mixture was boiled for 1 hour and then filtered to obtain 67 g. of 3,5,3',5'-tetramethyl-4,4'-xylylenedipyrazole in the form of a white solid melting at 334°–335° C. The compound was converted to the diacetyl derivative by refluxing with a large excess of acetic anhydride for one-half hour and stripping the solution to dryness. The product was recrystallized from toluene, hexane to yield a crystalline solid melting at 153°–154° C. The NMR spectrum was in agreement with the proposed structure: singlets at 2.96, 6.30, 7.33, 7.48, and 7.90$\pi$ with relative areas of 2:2:3:3:3.

Anal. Calcd. for
$C_{22}H_{26}N_4O_2$: C, 69.8; H, 6.92
Found: C, 69.7; H, 7.07

Part B

To a nitrogen-blanketed suspension of 14.7 g. (0.05 mole) of 3,5,3',5'-tetramethyl-4,4'-xylylenedipyrazole in 300 ml. of toluene were added 13.7 ml. (0.1 mole) of triethylborane. The mixture warmed spontaneously to 32° C. and most of the solid dissolved. The mixture was heated at reflux overnight and the theoretical amount of ethane was evolved, as measured by a gas meter. The mixture was cooled to room temperature and filtered to obtain a polymer having a plurality of units having the structure

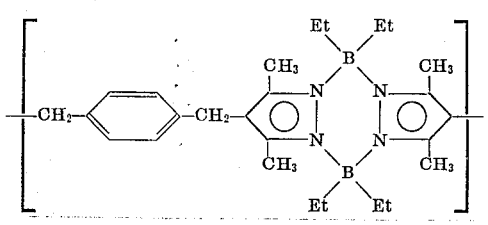

The polymer softens above 360°C. on a melting point block. When pressed between platens at 220° C., the polymer is converted into a tough, transparent, hard-surfaced film which is useful for packaging.

EXAMPLE 26

Polymer from 4,4'-Methylenedipyrazole and Triethylborane

A mixture of methylene bromide (174 g., 1 mole) and pyrazole (136 g., 2 moles) was heated in an autoclave at 200° C. for 3 hours. The reaction product was a spongy, rock-like solid. It was dissolved in 900 ml. of boiling water and the solution made slightly basic with 50 percent sodium hydroxide. A brown solid precipitated. It was purified by recrystallization from boiling water and finally by sublimation.

From five such runs were obtained a total of 116 g. (31.4 percent) of white solid 4,4'-methylenedipyrazole; m.p. 194°–196° C. It is water soluble, giving an immediate precipitate with Ag$^+$ ion. The NMR spectrum has two singlets of equal intensity at 2.28 and 6.17τ.

Anal. Calcd. for
$C_7H_8N_4$: C, 56.7; H, 5.44; N, 37.8
Found: C, 56.0; H, 5.55; N, 38.6

Triethylborane (13.7 ml.) was added under nitrogen to a suspension of 7.4 g. of 4,4'-methylenedipyrazole in 300 ml. of toluene. The solid dissolved immediately. The solution was stirred and heated at reflux until 2.5 liters of ethane were evolved. The solution was cooled and a solid precipitated. It was recovered by filtration, washed with ether, and air-dried to obtain 13.4 g. of polymer of the structure indicated below.

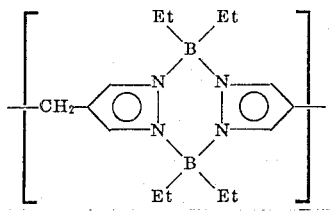

The polymer is soluble in hot toluene and softens above 300° C. on a melting point block. When pressed between platens at 230° C./10,000 psi., it yields translucent films which are useful for packaging. The infrared absorption spectrum of one of these films exhibits bands at 2,920, 2,850, 1,442, 1,410, 1,342, 1,264, 1,118, 1,098, 1,050, 1,019, 902, 856, 848, and 827 cm.$^{-1}$.

EXAMPLE 27

Polymer from 4,4'-Methylenedipyrazole and Trimethylamine Borane

A solution of 7.4 g. of 4,4'-methylenedipyrazole and 7.3 g. of trimethylamine borane in 50 ml. of N,N-dimethylacetamide was heated at reflux. The emerging gases were scrubbed in sulfuric acid and led to a gas meter. When 2.4 liters of hydrogen had evolved, a solid precipitate started to form in the reaction mixture. The reaction mixture was filtered and the solid was washed with methanol. It was dissolved in hot hexamethylenephosphoramide and the resulting solution was poured into excess methanol to precipitate 4 g. of polymer of the structure indicated below.

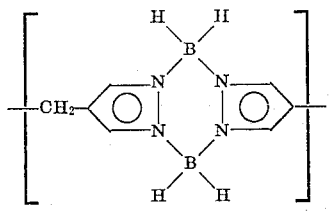

On a melting point block, the polymer softened at 250°–270° C. and slowly turned amber at 380°–430° C. The inherent viscosity (0.1 percent in dimethylformamide at 25°C.) is 0.09. A solution of the polymer in hexamethylenephosphoramide was cast and dried to yield a transparent film.

Anal. Calcd. for
$[C_7H_{10}B_2N_4]_n$: C, 48.8; H, 5.82; N, 32.6
Found: C, 48.6; H, 5.93; N, 32.8

EXAMPLE 28

Polymer from 3,5,3',5'-Tetraphenyl-1,6-hexamethylenedipyrazole and Triethylborane Example 25 is repeated essentially as described except that the bis(diketone) is replaced with 1,1,8,8-tetrabenzoyloctane. The polymeric repeat unit now has the structure

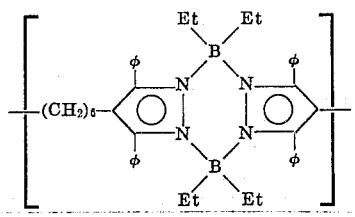

EXAMPLE 29

Polymer from 3,5,3',5'-Tetraphenyl-1,10-decamethylenedipyrazole and Triethylborane Example 28 is repeated, substituting 1,1,12,12-tetrabenzoyldodecane for the octane derivative, in which case the polymer repeat unit contains a decamethylene group in place of the hexamethylene group.

Representative of all the possible monomeric and polymeric symmetrical pyrazaboles and sym-triazaboles of the instant invention is the formula designated III,

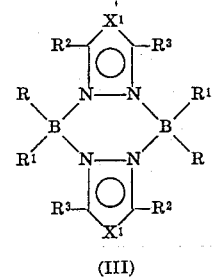

(III)

wherein $R^2$ and $R^3$ are as subsequently defined, and R and $R^1$ may be selected from a group which consists of hydrogen, halogen, 1-pyrazolyl, alkyl, aryl, alkoxy, haloalkoxy, aryloxy, alkylamino, arylamino, azido, alkylmercapto and arylmercapto; R and $R^1$ attached to the same boron conjointly are

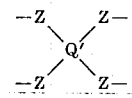

wherein Z is a saturated heteroatom which may be selected from a group which consists of oxygen, sulfur, nitrogen and phosphorus, and Q' is a hydrocarbon, preferably of 4–30 carbon atoms, polyradical which may be selected from a group which consists of a pair of diradical linking units and a tetraradical linking unit, with the proviso that when R and $R^1$ are taken conjointly, the resultant structure is a polymeric repeat unit

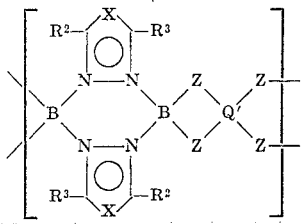

wherein Z and Q' are as previously defined, X may be selected from a group which consists of N and $CR^4$, and $R^2$, $R^3$ and $R^4$ may be selected from a group which consists of hydrogen, alkyl, halogen, haloalkyl, aryl, cyano, alkoxy, alkoxy-carbonyl, arylamino, nitro, acyl, mercapto and hydroxy, and $R^2$ and $R^4$ conjointly may be selected from a group which consists of benzo and naphtho; $X^1$ may be selected from a group which consists of X, as previously defined, and $C(Q'')_n$ wherein $Q''$ is $\alpha,\omega$-hydrocarbylene of one to 18 carbon atoms, preferably alkylene of one to 10 carbon atoms, p-phenylene, p,p'-diphenylene and p-xylylene, and $n$ is zero or one, with the proviso that when $X^1$ is $C(Q'')_n$, the resultant structure is a polymeric repeat unit

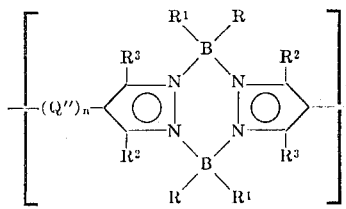

wherein R, $R^1$, $R^2$, and $R^3$ are as previously defined.

EXAMPLE 30

4,4-Difluoropyrazabole

To a solution of 25.4 ml. (0.2 mole) of $BF_3$ etherate in 100 ml. of ether there was added slowly a solution of 18.6 g. (0.1 mole) of potassium dihydrobis(1-pyrazolyl)borate in 100 ml. of tetrahydrofuran. An exothermic reaction took place, and a solid began to precipitate. When the exothermicity subsided, the reaction mixture was stripped.

Another run on the same scale involved reverse addition. The two runs were inadvertently combined and were hence processed together by dissolving the stripping residue in water and extracting with methylene chloride. The extracts were stripped yielding 29 g. (75 percent) of an oil which solidified on standing. This oil was further purified by distillation in vacuo. The product boiled at 100°/4.7 mm. and melted, after recrystallization from hexane, at 87°–88° C.

Anal. Calcd. for
$C_6H_8B_2F_2N_4$: C, 36.7; H, 4.08; N, 28.6
Found: C, 36.9; H, 4.68; N, 28.4

The nmr spectrum had a doublet (J = 2.3) at 2.09$\tau$, an unresolved doublet at 2.35$\tau$ and poorly resolved triplet (J≈2) at 3.61 in 1:1:1 ratio. The $BH_2$ hydrogens were detectable by integration in the 4–9$\tau$ range. The infrared spectrum contained a strong $BH_2$ multiplet similar to that of pyrazabole.

The $B^{11}$ nmr spectrum had two triplets at +17.7 ppm (J = 21) and +26.5 ppm (J = 110) from trimethyl borate.

EXAMPLE 31

4,4-Diethylpyrazabole

To a solution of 30 ml. (0.4 mole) of trifluoroacetic acid, stirred under nitrogen in 200 ml. of benzene, there was added 56.4 ml. (0.4 mole) of triethylborane. Evolution of ethane commenced spontaneously and proceeded rapidly, necessitating occasional cooling. When 9.6 l. of ethane had been evolved, a solution of 75 g. (0.4 mole) of potassium dihydrobis(1-pyrazolyl)borate in 400 ml. tetrahydrofuran was added slowly. An exothermic reaction took place. When this reaction subsided, the tetrahydrofuran was distilled out; the residue was stirred with water and extracted with ether. Stripping of the organic layer gave an oil which was distilled, collection being made of the 110°–140° C./2.7 mm cut. This product solidified on standing and was obtained in 62 g. (72 percent) yield. The material was purified further by recrystallization from petroleum ether; m.p. 61°–62° C.

Anal. Calcd. for
$C_{10}H_{18}B_2N_4$: C, 55.5; H, 8.33; N, 25.9
Found: C, 55.5; H, 8.15; N, 26.2

The nmr spectrum consisted of a doublet (J = 2.5) at 2.43$\tau$, a triplet (J = 2.5) at 3.69$\tau$ and a three-peak multiplet centered at 9.34$\tau$, in 4:2:10 ratio. The $BH_2$ hydrogens can be seen by integration in the 3010$\tau$ range.

The $B^{11}$ nmr spectrum had a broad peak at +16.5 ppm overlapping an unresolved triplet at +26.6 ppm, from trimethyl borate.

EXAMPLE 32

4,4-Diethylpyrazabole

A suspension of 38 g. (0.2 mole) of p-toluenesulfonic acid monohydrate was stirred and refluxed in 250 ml. of toluene until no more water was evolved into the attached Dean-Stark trap and a clear solution resulted. To this solution there was added under nitrogen 28.2 ml. (0.2 mole) of triethylborane. The resulting solution was stirred and refluxed until 5.4l. of gas was evolved. The resulting solution was cooled, transferred rapidly to an addition funnel and added dropwise to a solution of 40 g. (0.2 mole) of $KH_2B(pz)_2$ in 400 ml. of dry tetrahydrofuran. The mixture was refluxed briefly and was then poured into 1 l. of water. The layers were separated, and the aqueous layer was extracted twice with hexane. The extracts were combined with the original organic layer, filtered and stripped. The residual oil was distilled in vacuo yielding 25 g. (58 percent) of the main cut, b.p. 105°–112° C./3.7 mm. The infrared spectrum was identical to that of authentic 4,4-diethylpyrazabole from Example 31.

EXAMPLE 33

4,4-Dibutylpyrazabole

A suspension of 38 g. (0.2 mole) of p-toluenesulfonic acid monohydrate was refluxed in 250 ml. toluene, the water being removed via a Dean-Stark trap. When the theoretical amount of water had been collected, the clear solution was cooled and 0.2 mole of tributylborane was added. The solution was stirred and refluxed until 0.1 mole of butane was evolved. The clear solution was cooled and transferred rapidly to an addition funnel. It was added dropwise to a solution of 40 g. (0.2mole) of $KH_2B(pz)_2$ in 400 ml. of tetrahydrofuran. The mixture was refluxed briefly and was then poured into 1 l. of water. The layers were separated, and the aqueous layer was extracted twice with hexane. The organic extracts were combined, dried over MgSO$_4$, filtered and stripped. The residue was purified by distillation, the main cut boiling at 142°–144° C./1.7 mm., $n_D^{25}$ = 1.502. The product was obtained in 33.4 g. (62 percent) yield.

Anal. Calcd. for

C$_{14}$H$_{26}$B$_2$N$_4$: C, 61.7; H, 9.57; N, 20.6

Found: C, 61.7; H, 9.86; N, 20.6.

The nmr spectrum had two overlapping doublets (unresolvable) centered at 2.52τ, a triplet (J = 2.4) at 3.83τ and a complex multiplet with sharp peaks at 9.17 and 9.25τ in 2:1:9 ratio.

EXAMPLE 34

Utility Of Unsymmetrical Pyrazaboles as Reducing Agents

To a chloroform solution of π-allylpalladium chloride dimer there was added at room temperature a chloroform solution of 4,4-diethylpyrazabole. Within a few seconds precipitation of metallic palladium commenced. The metal was deposited in part as a shiny mirror on the walls of the test tube.

In a similar experiment 4,4-dibutylpyrazabole was used. Here, too, precipitation of palladium metal was rapid and complete.

EXAMPLE 35

4,4-Dichloro-8,8-diethylpyrazabole

Chlorine was bubbled into a solution of 43.2 g. (0.2 mole) of 4,4-diethylpyrazabole in 500 ml. of carbon tetrachloride until the yellow color persisted. The solution was stripped to dryness, and the residue was recrystallized from hexane. The product was obtained in 51.5 g. (90.5 percent) yield as colorless crystals, m.p. 90°–91° C.

Anal. Calcd. for

C$_{10}$H$_{16}$B$_2$Cl$_2$N$_4$: C, 42.1; H, 5.62; Cl, 24.9; N, 19.7

Found: C, 41.5; H, 5.30; Cl, 24.4; N, 19.7

The nmr spectrum had doublets at 1.76τ (J = 2.5) and 2.25τ (J = 2.3), a triplet at 3.37τ (J = 2.4) and a multiplet at about 9.4τ in 1:1:1:5 ratio.

EXAMPLE 36

4,4-Diethyl-8,8-o-phenylenedioxypyrazabole

A mixture of 10.8 g. (0.05 mole) of 4,4-diethylpyrazabole and 5.5 g. (0.05 mole) of pyrocatechol was refluxed in 150 ml. xylene. Hydrogen evolution was sluggish. The solvent was distilled out, whereupon the rate of hydrogen evolution increased, 2.4 l. of H$_2$ finally being collected. The crude reaction mixture was chromatographed on alumina. Elution with hexane gave 1.7 g. of a solid which was identified as 4,4-diethylpyrazabole. By switching to ether-hexane as the eluent, a second product fraction was obtained in 11.8 g. yield (79 percent yield based on unrecovered 4,4-diethylpyrazabole). This material was recrystallized from heptane; m.p. 82°–83° C.

Anal. Calcd. for

C$_{16}$H$_{20}$B$_2$N$_4$O$_2$: C, 59.6; H, 6.22; N, 17.4

Found: C, 59.2; H, 5.97; N, 17.6

The nmr spectrum had two overlapping doublets at 2.23τ (J = 2.6) and 2.30τ (J = 2.5), each split further by 0.6 cps, a singlet at 3.12τ, a triplet at 3.56τ (J = 2.55) and a "triplet" at 9.29τ in 1:1:2:1:5 ratio.

EXAMPLE 37

Polymer from 4,4-Dibutylpyrazabole and 1,4-Hydroquinone

A mixture of 5.4 g. (0.02 mole) of 4,4-dibutylpyrazabole and 2.2 g. (0.02 mole) of 1,4-hydroquinone was stirred and refluxed in 50 ml. of o-dichlorobenzene. Hydrogen was evolved. The evolution ceased after about 0.6 l. of H$_2$ had been collected. A white solid separated which was filtered and obtained in 5.0 g. yield; m.p. 145°–150° C. It could be pressed to a tough film of the type useful for packaging.

The infrared spectrum of the product lacked the BH$_2$ bands but had an —OH band at 3,350cm.$^{-1}$, indicating endcapping of the polymer by —OC$_6$H$_4$OH groups.

EXAMPLE 38

4,4-Diethyl-8,8-bis(1-pyrazolyl)pyrazabole

To a mechanically stirred slurry of 16 g. (0.05 mole) of potassium tetrakis(1-pyrazolyl)borate in 200 ml. toluene there was added 42 ml. of a 1.7M solution of diethylboryl methanesulfonate in toluene. The slurry was stirred and refluxed for 1 hour. It was then cooled, stirred with water and extracted with ether. The organic layer was dried, filtered and stripped, and the residue was chromatographed on acid-washed alumina, eluting first with hexane (which removed some 4,4,8,8-tetraethylpyrazabole), then with ether which eluted the desired product. This product was obtained in 12.7 g. (73 percent) yield and was further purified by recrystallization from heptane; m.p. 120°–121° C.

Anal. Calcd. for

C$_{16}$H$_{22}$B$_2$N$_8$: C, 55.8; H, 6.32; N, 32.2

Found: C, 55.3; H, 6.45; N, 32.8

The nmr spectrum was confirmatory for 4,4-diethyl-8,8-bis(1-pyrazolyl)pyrazabole. The spectrum had two overlapping doublets at 2.26τ, a doublet (J = 2.6, J' = 0.7) at 2.54τ, a doublet (J = 2.3, J' = 0.6) at 3.05τ, a triplet (J = 2.5) at 3.48τ, a "triplet" (overlapping doublets J = 2.3 and 1.7) at 3.74τ and an asymmetric "doublet" (B-ethyls) at 9.48τ in the correct 4:2:2:2:2:10 ratio.

EXAMPLE 39

4,4-Diethyl-1,3,5,7-tetramethylpyrazabole

To a mechanically stirred slurry of 29 g. (0.12 mole) of potassium dihydrobis(3,5-dimethyl-1-pyrazolyl)borate in 400 ml. of toluene there was added slowly 100 ml. of a 1.2M solution of diethylboryl methanesulfonate in toluene. A moderately exothermic reaction took place, and the flask contents gelled partially as potassium methanesulfonate precipitated. The slurry was refluxed with stirring for 1 hour and was then cooled and stirred with 500 ml. of water. The organic layer was separated, dried, filtered, and stripped. The residue solidified on cooling. There was obtained 26 g. (96 percent yield) of a solid which was purified by recrystallization from methanol; m.p. 91°–92° C. This material could also be distilled in vacuo, b.p. 158° C/1.5 mm.

Anal. Calcd. for

C$_{14}$H$_{26}$B$_2$N$_4$: C, 61.8; H, 9.56; N, 20.6

Found: C, 62.5; H, 9.22; N, 20.7

The infrared spectrum contained the BH₂ band as a complex multiplet in the 2,270–2,450 cm⁻¹ range.

The nmr spectrum was confirmatory for 4,4-diethyl-1,3,5,7-tetramethylpyrazabole. The spectrum had singlets at 4.14, 7.66, and 7.78τ as well as a complex multiplet (B-ethyls) in the correct 1:3:3:5 ratio.

All of the 4,4-disubstituted pyrazaboles of this invention absorb strongly in the ultraviolet region. The opacity toward certain wavelengths of ultraviolet light (i.e., light having a wavelength less than 400 millimicrons) which these compounds exhibit makes them useful in the protection of light-sensitive or light-fugitive materials against degradation by ultraviolet light. The 4,4-disubstituted pyrazaboles can be incorporated in films and fibers of natural or synthetic organic polymers, many of which fail prematurely when exposed intermittently or continuously to ultraviolet light. Acting as absorbers, the pyrazaboles will serve to reduce deterioration of the polymers and/or of the dyes used therewith caused by ultraviolet radiation. The 4,4-disubstituted pyrazaboles of this invention are also valuable for incorporation in containers, covers for display cases and the like where protection of the contents from the deleterious action of ultraviolet light is desired.

UV spectral data on the asymmetric pyrazaboles of this invention are set forth in TABLE VI.

TABLE VI

| Compound | Example No. | UV Absorption |
| --- | --- | --- |
| 4,4-Difluoropyrazabole | 30 | λmax 213 mμ; k = 67.3; ε = 13200 |
| 4,4-Diethylpyrazabole | 31 | λmax 215 mμ; k = 51.9; ε = 11200 |
| 4,4-Dibutylpyrazabole | 33 | λmax 215 mμ; k = 43.9; ε = 11900 |
| 4,4-Diethyl-8,8-o-phenylenedioxypyrazabole | 35 | λmax 287 mμ; k = 13.4; ε = 4320 |
| | | λmax 280 mμ; k = 16.5; ε 5320 |
| | | λmax 275 mμ; k = 13.8; ε = 4480 |
| | | λmax 215 mμ; k = 62.1; ε = 20000 |
| 4,4-Diethyl-8,8-bis(1-pyrazolyl)pyrazabole | 37 | λmax 217.5 mμ; k = 55.93; ε = 19400 |
| 4,4-Diethyl-1,3,5,7-tetramethylpyrazabole | 38 | λmax 219 mμ; k = 65.9; ε = 17800 |

All of the products of this invention, the pyrazaboles, sym-triazaboles and polymers prepared from them, are useful as combustible additives to compositions employed in fireworks displays to impart pleasing green colors to the flames.

Since obvious modifications and equivalents will be evident to those skilled in the chemical arts, I propose to be bound solely by the appended claims.

I claim:

1. A compound having the formula:

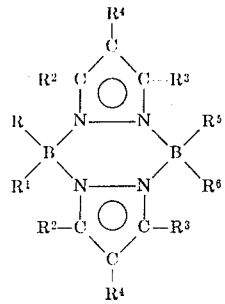

wherein

R, R¹, R⁵ and R⁶ are hydrogen, fluorine, chlorine, bromine, iodine, alkyl of up to 18 carbon atoms, phenyl, substituted phenyl in which the substituents can be lower alkyl of up to six carbon atoms and/or halo, lower alkoxy of up to six carbon atoms, phenoxy, haloloweralkoxy of up to six carbon atoms, lower alkylamino of up to six carbon atoms, anilino, azido, 1-pyrazolyl, lower alkyl mercapto of up to six carbon atoms and phenylmercapto, R, R¹, R⁵ and R⁶ being chosen such that when at least one of R and R¹ is different from R⁵ and R⁶, neither R⁵ nor R⁶ can be 1-pyrazolyl;

R², R³ and R⁴ are hydrogen, chlorine, bromine and iodine, alkyl of up to 18 carbon atoms, haloloweralkyl of up to six carbon atoms, phenyl, substituted phenyl in which the substituents can be lower alkyl of up to six carbon atoms and/or halo, lower alkoxy carbonyl in which the alkyl group contains up to six carbon atoms, cyano, lower alkoxy of up to six carbon atoms, anilino, nitro, carboxylic acyl of up to eight carbon atoms, mercapto and hydroxy, and R² and R⁴ when taken conjointly are benzo or naphtho.

2. The compound of claim 1 wherein R², R³ and R⁴ are hydrogen; and R, R¹, R⁵ and R⁶ are 1-pyrazolyl, 4,4,8,8-tetrakis(1-pyrazolyl)pyrazabole.

3. A compound of claim 1 wherein R², R³ and R⁴ are hydrogen; and R, R¹, R⁵ and R⁶ are halogen, 4,4,8,8-tetrahalopyrazabole.

4. A compound of claim 1 wherein R², R³ and R⁴ are hydrogen; and R, R¹, R⁵ and R⁶ are lower alkyl of one to six carbon atoms, 4,4,8,8-tetraloweralkylpyrazabole.

5. The compound of claim 1 wherein R², R³ and R⁴ are hydrogen; R and R⁵ are phenyl; and R¹ and R⁶ are 1-pyrazolyl, 4,8-diphenyl-4,8-bis(1-pyrazolyl)pyrazabole.

6. The compound of claim 1 wherein and R, R¹, R², R³, R⁴, R⁵ and R⁶ are hydrogen, pyrazabole.

7. A compound of claim 1 wherein R, R¹, R⁴, R⁵ and R⁶ are hydrogen; and R² and R³ are lower alkyl of 1 to 6 carbon atoms, 1,3,5,7-tetraloweralkylpyrazabole.

8. The compound of claim 1 wherein R, R¹, R⁴, R⁵ and R⁶ are hydrogen and R² and R³ are phenyl, 1,3,5,7-tetraphenylpyrazabole.

9. A compound of claim 1 wherein R¹, R², R³, R⁵ and R⁶ are hydrogen; and R⁴ is halogen, 2,6-dihalopyrazabole.

10. The compound of claim 1 wherein R = R¹ = R² = R³ = R⁴ = H and R⁵ = R⁶ = fluorine, 4,4-difluoropyrazabole.

11. The compound of claim 1 wherein R = R¹ = R² = R³ = R⁴ = H and R⁵ = R⁶ = ethyl, 4,4-diethylpyrazabole.

12. The compound of claim 1 wherein R = R¹ = R² = R³ = R⁴ = H and R⁵ = R⁶ = butyl, 4,4,-dibutylpyrazabole.

13. The compound of claim 1 wherein R = R¹ = ethyl, R² = R³ = R⁴ = H and R⁵ = R⁶ = chlorine, 4,4-dichloro-8,8-diethylpyrazabole.

14. The compound of claim 1 wherein R and R¹ taken together represent o-phenylenedioxy, R² = R³ = R⁴ = H and R⁵ = R⁶ = ethyl, 4,4-diethyl-8,8-o-phenylenedioxypyrazabole.

15. The compound of claim 1 wherein R = R¹ = 1-pyrazolyl, R² = R³ = R⁴ = H and R⁵ = R⁶ = ethyl, 4,4-diethyl-8,8-bis(1-pyrazolyl)pyrazabole.

16. The compound of claim 1 wherein $R = R^1 = R^4 =$ H, $R^2 = R^3 =$ methyl and $R^5 = R^6 =$ ethyl, 4,4-diethyl-1,3,5,7-tetramethylpyrazabole.

17. 1,3,5,7-Tetrakis(perfluoroloweralkyl)pyrazabole wherein lower alkyl contains 1–6 carbon atoms.

18. 2,6-Bis(perfluoroloweralkyl)pyrazabole wherein lower alkyl contains one to six carbon atoms.

19. 4,4,8,8-Tetrakis(chloroloweralkoxy)pyrazabole wherein lower alkyl contains one to six carbon atoms.

* * * * *

UNITED STATES PATENT OFFICE
CERTIFICATE OF CORRECTION

Patent No. 3,681,381                    Dated August 1, 1972

Inventor(s) Swiatoslaw Trofimenko

It is certified that error appears in the above-identified patent and that said Letters Patent are hereby corrected as shown below:

On the front page format, "Attorney- James W. Ryan" should read -- Attorney - James H. Ryan --; in the Abstract, after the formula insert -- , wherein --; column 4, all the matter beginning with line 22 to the end of the column should be canceled and inserted after line 29, column 5; column 17, line 36, "performing" should read -- preforming --; column 20, line 8, a bracket should be inserted after "$N_4$"; column 25, Table VI, Example 37, "55.93" should read -- 55.9--; column 26, line 48, after "wherein" insert -- R, --. Cancel columns 15 and 16 and substitute the attached sheet:

Signed and sealed this 26th day of December 1972.

(SEAL)
Attest:

EDWARD M. FLETCHER, JR.                ROBERT GOTTSCHALK
Attesting Officer                      Commissioner of Patents sisted. The solvents were stripped and the residue was purified by recrystallization from toluene and then by sublimation. There were obtained 2.6 g. (72 percent) of solid 4,8-dichloro-2,6-bis(per-found in the following table (Table V) which depicts the products obtained when a variety of boranes and azoles are interacted using previously described procedures.

TABLE V

| | Boron-containing Reactant | Azole Reactant | Procedure of Example: | Pyrazabole and Triazabole Products |
|---|---|---|---|---|
| 1 | Diborane | 3,4,5-trimethylpyrazole | 3 | 1,2,3,5,6,7-hexamethylpyrazabole. |
| 2 | Tetrahydrofuran borane | 3-ethylpyrazole | 3 | 1,5(7)-diethylpyrazabole. |
| 3 | Pyridine borane | 3-ethynylpyrazole | 3 | 1,5(7)-diethynylpyrazabole |
| 4 | Butoxydichloroborane | 3-butadienylpyrazole | 3 | 1,5(7)-dibutadienyl-4,8-dibutoxy-4,8-dichloropyrazabole. |
| 5 | Methoxydichloroborane | 3-methyl-5-phenylpyrazole | 3 | 4,8-dichloro-4,8-dimethoxy-1,5(7)-dimethyl-3,7(5)-diphenyl-pyrazabole. |
| 6 | Ethoxydichloroborane | 3,4,5-triphenylpyrazole | 3 | 4,8-dichloro-4,8-diethoxy-1,2,3,5,6,7-hexaphenylpyrazabole. |
| 7 | 2-chloroethoxydichloroborane | 3-methyl-5-chloropyrazole | 3 | 3,4,7(5),8-tetrachloro-4,8-bis(2-chloroethoxy)-1,5(7)-dimethylpyrazabole. |
| 8 | 3-chloropropoxydichloroborane | 4-β-aminoethylpyrazole | 3 | 4,8-dichloro-4,8-bis(3-chloropropoxy)-2,6-bis(2-aminoethyl)-pyrazabole. |
| 9 | 4-chlorobutoxydichloroborane | 4,5-diformylpyrazole | 3 | 4,8-dichloro-4,8-bis(4-chlorobutoxy)-2,3,6,7(5)-tetraformyl-pyrazabole. |
| 10 | Allyloxydichloroborane | 3-benzoylpyrazole | 3 | 4,8-bis(allyloxy)-4,8-dichloro-1,5(7)-dibenzoylpyrazabole. |
| 11 | But-3-en-1-yloxydichloroborane | 3,5-diacetyl-4-phenylpyrazole | 3 | 1,3,5,7-tetraacetyl-4,8-bis(but-3-en-1-yloxy)-4,8-dichloro-2,6-diphenylpyrazabole. |
| 12 | 2-methylallyloxydichloroborane | 3-methylindazole (i.e. 3-methylbenzopyrazole) | 3 | 4,8-dichloro-4,8-bis(2-methallyloxy)-3,7-dimethyldibenzo-[a,g]pyrazabole. |
| 13 | Dimethoxychloroborane | 5,7-dimethylindazole | 3 | 4,4,8,8-tetramethoxybis(2,4-dimethylbenzo[a,g]pyrazabole. |
| 14 | Diethoxychloroborane | 3,5-dichloroindazole | 3 | 3,7-dichloro-4,4,8,8-tetraethoxybis(2-chlorobenzo[a,g]pyrazabole. |
| 15 | Dibutoxychloroborane | 5,6-diaminoindazole | 3 | 4,4,8,8-tetrabutoxybis(2,3-diaminobenzo[a,g]pyrazabole. |
| 16 | Bis(2-chloroethoxy)-chloroborane | 5,6-dihydroxyindazole | 3 | 4,4,8,8-tetrakis(2-chloroethoxy)bis(2,3-dihydroxybenzo[a,g]-pyrazabole. |
| 17 | Bis(3-chloropropoxy)-chloroborane | 3-bromo-4-phenyl-pyrazole | 3 | 1,5(7)-dibromo-4,4,8,8-tetrakis(3-chloropropoxy)-2,6-diphenylpyrazabole. |
| 18 | Bis(4-chlorobutoxy)-chloroborane | 3,5-dimercapto-1,2,4-triazole | 3 | 4,4,8,8-tetrakis(4-chlorobutoxy)-1,3,5,7-tetramercapto-sym-triazabole. |
| 19 | Diallyloxychloroborane | 3,5-dimethyl-4-nitropyrazole | 3 | 4,4,8,8-tetrakis(allyloxy)-1,3,5,7-tetramethyl-2,6-dinitropyrazabole. |
| 20 | Bis(but-2-en-1-yl-oxy)-chloroborane | 3-anilino-5-phenylpyrazole | 3 | 1,5(7)-dianilino-4,4,8,8-tetrakis(but-2-en-1-yloxy)-3,7(5)-diphenylpyrazabole. |
| 21 | Bis(1-methylallyloxy)-chloroborane | 3-methyl-4-hydroxy-5-phenylpyrazole | 3 | 2,6-dihydroxy-4,4,8,8-tetrakis(1-methallyloxy)-1,5(7)-dimethyl-3,7(5)-diphenylpyrazabole. |
| 22 | Bis(2-methylallyloxy)-chloroborane | 3-methoxy-5-methyl-pyrazole | 3 | 4,4,8,8-tetrakis(2-methallyloxy)-1,5(7)-dimethoxy-3,7(5)-dimethylpyrazabole. |
| 23 | Bis(3-methylallyloxy)-chloroborane | 4-hydroxymethylpyrazole | 3 | 2,6-bis(hydroxymethyl)-4,4,8,8-tetrakis(3-methallyloxy)-pyrazabole. |
| 24 | Ethylenedioxychloroborane | 3-acetylindazole | 3 | 3,7-diacetyl-4,4,8,8-bis(ethylenedioxy)dibenzo[a,g]pyrazabole. |
| 25 | Diphenoxychloroborane | 3-cyanoindazole | 3 | 3,7-dicyano-4,4,8,8-tetraphenoxydibenzo[a,g]pyrazabole. |
| 26 | Phenoxydichloroborane | 3-dimethylaminomethylindazole | 3 | 4,8-dichloro-3,7-bis(dimethylaminomethyl)-4,8-diphenoxydibenzo[a,g]pyrazabole. |
| 27 | o-Phenylenedioxychloroborane | Benz[f]indazole (i.e., naphtho[2,3-d]pyrazole) | 3 | 4,4,8,8-bis(o-phenylenedioxy)dinaptho[2,3-a:2,3-g]-pyrazabole. |
| 28 | p-Methoxyphenyldichloroborane | 3-chloro-5-methyl-1,2,4-triazole | 3 | 1,4,5(7),8-tetrachloro-4,8-bis(p-methoxyphenyl)-3,7(5)-dimethyl-sym-triazabole. |
| 29 | Dibutoxybromoborane | 3-hydroxy-5-phenyl-1,2,4-triazole | 3 | 4,4,8,8-tetrabutoxy-1,5(7)-dihydroxy-3,7(5)-diphenyl-sym-triazabole. |
| 30 | Boron trifluoride | 4-iodopyrazole | 2 | 2,6-diiodo-4,4,8,8-tetrakis(4-iodopyrazol-1-yl)pyrazabole. |
| 31 | Boron trichloride | 3-methoxy-5-methyl-pyrazole | 2 | 1,5(7)dimethoxy-4,4,8,8-tetrakis(3(5)-methoxy-5(3)-methylpyrazol-1-yl)-3,7(5)dimethylpyrazabole. |
| 32 | Boron tribromide | 3-allylamino-5-phenylpyrazole | 2 | 1,5(7)-bis(3-allylamino)-4,4,8,8-tetrakis(3-allylamino-5-phenylpyrazol-1-yl)-3,7(5)-diphenylpyrazabole. |
| 33 | Boron triiodide | Ethyl 4-pyrazole-carboxylate | 2 | 2,6-bis(ethoxycarbonyl)-4,4,8,8-tetrakis(4-ethoxy-carbonylpyrazol-1-yl)pyrazabole. |
| 34 | Phenyldibromoborane | Methyl 4-phenyl-pyrazole-3-carboxylate | 11 | 1,5(7)-bis(methoxycarbonyl)-4,8-bis(3-ethoxycarbonyl-4-phenyl-pyrazol-1-yl)-2,4,6,8-tetraphenylpyrazabole. |
| 35 | p-Phenyloxyphenyl-dibromoborane | Pyrazole | 11 | 4,8-bis(p-phenoxyphenyl)-4,8-dipyrazol-1-ylpyrazabole. |
| 36 | n-butyldichloroborane | do | 11 | 4,8-bis(n-butyl)-4,8-dipyrazol-1-ylpyrazabole. |
| 37 | a-naphthyldichloroborane | do | 11 | 4,8-bis(a-napthyl)-4,8-dipyrazol-1-ylpyrazabole. |
| 38 | phenylbutoxybromoborane | do | 3 | 4,8-dibutoxy-4,8-diphenylpyrazabole. |
| 39 | Bis(2-chlorovinyl)-chloroborane | do | 3 | 4,4,8,8-tetrakis(2-chlorovinyl)pyrazabole. |
| 40 | Dibutylchloroborane | do | 3 | 4,4,8,8-tetrabutylpyrazabole. |
| 41 | Azidodiphenylborane* | do | 3 | 4,4,8,8-tetraphenylpyrazabole. |
| 42 | Dimethylbromoborane | do | 3 | 4,4,8,8-tetramethylpyrazabole. |
| 43 | Diphenylchloroborane | do | 3 | 4,4,8,8-tetraphenylpyrazabole. |
| 44 | Anilinodimethylborane | do | 19 | 4,8-dianilino-4,8-dimethylpyrazabole. |
| 45 | Ethylborane | do | 22-C | 4,8-diethylpyrazabole. |
| 46 | Methylborane | do | 22-C | 4,8-dimethylpyrazabole. |
| 47 | Diethylborane | do | 22-C | 4,4,8,8-tetraethylpyrazabole. |
| 48 | Dimethylborane | do | 22-C | 4,4,8,8-tetramethylpyrazabole. |
| 49 | Butylborane | do | 22-C | 4,8-dibutylpyrazabole. |
| 50 | Phenylborane | do | 22-C | 4,8-diphenylpyrazabole. |
| 51 | Dimethoxyborane | do | 22-C | 4,4,8,8-tetramethoxypyrazabole. |
| 52 | Dimethylaminoborane | do | 22-C | 4,4,8,8-bis(dimethylamino)pyrazabole. |
| 53 | Tris(methylthio)borane | do | 19 | 4,4,8,8-tetrakis(methylthio)pyrazabole. |
| 54 | Methylthiodichloroborane | do | 3 | 4,8-bis(methylthio)-4,8-dipyrazol-1-ylpyrazabole. |
| 55 | Tris(n-pentylthio)borane | do | 19 | 4,4,8,8-tetrakis(n-pentylthio)pyrazabole. |
| 56 | Ethylthiodibromoborane | do | 3 | 4,8-bis(ethylthio)-4,8-dipyrazol-1-ylpyrazabole. |
| 57 | Diazidodimethylamino-borane* | do | 3 | 4,8-diazido-4,8-bis(dimethylamino)pyrazabole. |
| 58 | Azidobis(dimethylamino)-borane* | do | 3 | 4,4,8,8-tetrakis(dimethylamino)pyrazabole. |
| 59 | Diazidodiethylamino-borane* | do | 3 | 4,8-diazido-4,8-bis(diethylamino)pyrazabole. |

(*) Azido compounds are explosive and must be handled with appropriate care.

fluoroisopropyl)pyrazabole; m.p. 143°–144° C. The IR spectrum indicates a B-H singlet at about 2,510 cm$^{-1}$.
Anal. Calcd. for
$C_{12}H_6B_2Cl_2F_{14}N_4$: C, 25.5; H, 1.06; Cl, 12.6; F, 47.2
Found: C, 25.7; H, 133; Cl, 13.6; F, 47.2.
Further exemplification of this invention may be The above examples have demonstrated the utility of the compounds of this invention in a variety of ways. Thus, when compounds having the formula I are heated with polyfunctional active hydrogen compounds, i.e. compounds having a plurality of active or Zerewitinoff hydrogen atoms, RH and R$^1$H are evolved and polymers are formed. These active hydrogen-contain-